US010484295B2

(12) United States Patent
Xiao et al.

(10) Patent No.: US 10,484,295 B2
(45) Date of Patent: Nov. 19, 2019

(54) METHOD, APPARATUS AND SYSTEM FOR CONTROLLING SERVICE TRANSMISSION RATE

(71) Applicant: Alibaba Group Holding Limited, Grand Cayman (KY)

(72) Inventors: Hongliang Xiao, Zhejiang (CN); Dacheng Zhang, Zhejiang (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 15/933,292

(22) Filed: Mar. 22, 2018

(65) Prior Publication Data

US 2018/0212892 A1 Jul. 26, 2018

Related U.S. Application Data

(63) Continuation of application No. PCT/CN2016/098961, filed on Sep. 14, 2016.

(30) Foreign Application Priority Data

Sep. 24, 2015 (CN) .......................... 2015 1 0617906

(51) Int. Cl.
*H04L 12/891* (2013.01)
*H04L 12/66* (2006.01)
(Continued)

(52) U.S. Cl.
CPC .............. *H04L 47/41* (2013.01); *H04L 12/66* (2013.01); *H04L 43/0894* (2013.01); *H04L 47/263* (2013.01)

(58) Field of Classification Search
CPC ... H04L 47/41; H04L 47/263; H04L 43/0894; H04L 12/66; H04L 47/125; H04L 45/24; H04L 29/06
(Continued)

(56) References Cited

U.S. PATENT DOCUMENTS

2008/0137541 A1\* 6/2008 Agarwal ................. H04W 4/02
370/241
2013/0294236 A1 11/2013 Beheshti-Zavareh et al.
(Continued)

FOREIGN PATENT DOCUMENTS

CN        1826773      8/2006
CN      101697528      4/2010
(Continued)

OTHER PUBLICATIONS

Translation of International Search Report from corresponding PCT application No. PCT/CN2016/098961 dated Dec. 12, 2016, 2 pages.
(Continued)

*Primary Examiner* — Faisal Choudhury
(74) *Attorney, Agent, or Firm* — Lee & Hayes, P.C.

(57) ABSTRACT

The present disclosure discloses a method, an apparatus and a system for controlling a service transmission rate. The method includes acquiring service transmission rate information reported by service gateways in a service gateway group in a distributed environment, the service gateways being gateways that transmit service data in parallel to an identical destination address and limit a transmission rate of service data based on respective flow limiting thresholds; adjusting a flow limiting threshold allocated to each service gateway to a specified value to obtain a specified threshold when a service transmission rate indicated by the service transmission rate information is greater than a flow limiting threshold corresponding to the service gateway, the specified values satisfying that a sum of the specified values on the service gateways is not greater than a bandwidth allocated by an operator to the destination address; and sending the specified thresholds to the service gateways. The present disclosure solves a technical problem that there is no technical solution effectively ensuring that a total traffic of flows limited in parallel satisfies an expected threshold after the
(Continued)

flows pass through multiple service gateways in a distributed environment.

20 Claims, 16 Drawing Sheets

(51) Int. Cl.
*H04L 12/825* (2013.01)
*H04L 12/26* (2006.01)

(58) Field of Classification Search
USPC .......................................................... 370/235
See application file for complete search history.

(56) References Cited

U.S. PATENT DOCUMENTS

| | | | |
|---|---|---|---|
| 2015/0124623 A1 | 5/2015 | Li et al. | |
| 2016/0198359 A1* | 7/2016 | Ryu | H04W 36/22 370/237 |
| 2017/0237673 A1* | 8/2017 | Law | H04L 47/25 370/338 |

FOREIGN PATENT DOCUMENTS

| | | |
|---|---|---|
| CN | 101911596 | 12/2010 |
| CN | 102196513 | 9/2011 |
| CN | 102223677 | 10/2011 |
| CN | 104821922 | 8/2015 |
| JP | 2013255178 A | 12/2013 |
| JP | 2015519823 A | 7/2015 |

OTHER PUBLICATIONS

Translation of Written Opinion from corresponding PCT application No. PCT/CN2016/098961 dated Dec. 12, 2016, 5 pages.
Machine translation of first Chinese Office Action dated Jul. 2, 2018 for Chinese patent application No. 201510617906.2, a counterpart foreign application of U.S. Appl. No. 15/933,292, 5 pages.
Chinese Search Report from corresponding Chinese patent application No. 201510617906.2 dated Jun. 18, 2018, 1 page.
Extended European Search Report dated Jun. 26, 2019 from EP patent Application No. 16848048.1, 7 pages.
Japanese Office Action dated Sep. 3, 2019 for Japanese Patent Application No. 2018-515580, counterpart of U.S. Appl. No. 15/933,292, 6 pages.

* cited by examiner

METHOD, APPARATUS AND SYSTEM FOR CONTROLLING SERVICE TRANSMISSION RATE

CROSS REFERENCE TO RELATED PATENT APPLICATIONS

This application claims priority to and is a continuation of PCT Patent Application No. PCT/CN2016/098961 filed on 14 Sep. 2016, and is related to and claims priority to Chinese Patent Application No. 201510617906.2, filed on 24 Sep. 2015, entitled "Method, Apparatus and System for Controlling Service Transmission Rate," which are hereby incorporated by reference in their entirety.

TECHNICAL FIELD

The present disclosure relates to the field of network communications, and in particular, to methods, apparatuses and systems for controlling a service transmission rate.

BACKGROUND

As shown in FIG. 1, multiple service gateway devices are deployed in a distributed way at enterprise exits, and traffic data from the Internet is shared among the multiple service gateway devices (e.g., service gateways A, B and C in FIG. 1) on an egress router by means of equivalent routing loads. Service transmission rates (also referred to as traffic) to destination hosts need to be limited on the service gateways due to the needs for resisting Distributed Denial of Service (DDoS) attacks or bandwidth limitation, to ensure that transmission rates of services entering an intranet do not exceed bandwidths purchased by users, thus avoiding an impact on intranet links.

However, as each service gateway limits flows (i.e., limits the service transmission rates) independently in such a distributed deployment scenario, how to ensure that the total traffic of the flows (i.e., a total service transmission rate for an identical destination address) that are limited in parallel satisfies an expected threshold after the flows pass through multiple service gateways needs to considered.

However, no effective solution has currently been proposed for the foregoing problem.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or computer-readable instructions as permitted by the context above and throughout the present disclosure.

Embodiments of the present disclosure provide a method, an apparatus and a system for controlling a service transmission rate, to solve at least a technical problem that no technical solution which effectively ensures a total traffic of flows limited in parallel to satisfy an expected threshold after the flows pass through multiple service gateways in a distributed environment exists.

According to the embodiments of the present disclosure, a method for controlling a service transmission rate is provided, which includes acquiring service transmission rate information reported by service gateways in a service gateway group in a distributed environment, wherein the service gateways are gateways that transmit service data in parallel to an identical destination address and limit service transmission rates of the service data based on respective flow limiting thresholds, and the service transmission rate information is used for indicating a service transmission rate on each service gateway for the destination address; determining whether the service transmission rate of each service gateway in the service gateway group indicated by the service transmission rate information is greater than a flow limiting threshold corresponding to the respective service gateway; adjusting the flow limiting thresholds allocated to the service gateways to specified values to obtain specified thresholds when at least one determination result is affirmative, wherein the specified values satisfy the following condition: a sum of the specified values on the service gateways is not greater than a bandwidth allocated to the destination address by an operator; and sending the specified thresholds to the service gateways.

According to the embodiments of the present disclosure, another method for controlling a service transmission rate is provided, which includes receiving specified thresholds by service gateways in a service gateway group, wherein the service gateways are gateways that transmit service data to an identical destination address in parallel and limit service transmission rates of the service data based on respective flow limiting thresholds, and the specified thresholds are determined using the following manner: adjusting the flow limiting thresholds allocated to the service gateways to specified values to obtain the specified thresholds when a service transmission rate on any service gateway in the service gateway group is greater than a flow limiting threshold corresponding to the corresponding service gateway, wherein the specified values satisfy the following condition: a sum of the specified values on the service gateways is not greater than a bandwidth allocated to the destination address by an operator; and limiting local transmission rates of the service data by the service gateways based on the specified thresholds.

According to the embodiments of the present disclosure, an apparatus for controlling a service transmission rate is provided, which includes an acquisition module configured to acquire service transmission rate information reported by service gateways in a service gateway group in a distributed environment, wherein the service gateways are gateways that transmit service data to an identical destination address in parallel and limit service transmission rates of the service data based on respective flow limiting thresholds, and the service transmission rate information is used for indicating a service transmission rate on each service gateway for the destination address; a determination module configured to determine whether the service transmission rate of each service gateway in the service gateway group indicated by the service transmission rate information is greater than a flow limiting threshold corresponding to the respective service gateway; an adjustment module configured to adjust the flow limiting thresholds allocated to the service gateways to specified values to obtain specified thresholds when at least one determination result output by the determination module is affirmative, wherein the specified values satisfy the following condition: a sum of the specified values on the service gateways is not greater than a bandwidth allocated to the destination address by an operator; and a sending module configured to send the specified thresholds to the service gateways.

According to the embodiments of the present disclosure, another apparatus for controlling a service transmission rate applied to service gateways in a service gateway group is provided, wherein the service gateways in the service gateway group are gateways that transmit service data to an identical destination address in parallel and limit service transmission rates of the service data based on respective flow limiting thresholds, the apparatus including a receiving module configured to receive specified thresholds, wherein the specified thresholds are determined using the following manner: adjusting the flow limiting thresholds allocated to the service gateways to specified values to obtain the specified thresholds when a service transmission rate on any service gateway in the service gateway group is greater than a flow limiting threshold corresponding to the service gateway, wherein the specified values satisfy the following condition: a sum of the specified values on the service gateways is not greater than a bandwidth allocated to the destination address by an operator; and a limiting module configured to limit local transmission rates of the service data based on the specified thresholds.

In the embodiments of the present disclosure, when a service transmission rate greater than a flow limiting threshold exists in service transmission rates for an identical destination address reported by service gateways, thresholds for limiting the service transmission rates of the destination address on the service gateways are dynamically adjusted, thus achieving an objective of limiting the service transmission rates for the destination address. As such, a technical effect of ensuring that a total traffic of parallel flows (i.e., a total service transmission rate for a same destination address) with limitation satisfies an expected threshold after the flows pass through multiple service gateways is achieved, thus solving the technical problem that there is no technical solution effectively ensuring that the total traffic of parallel flows with limitation satisfies an expected threshold after the flows pass through multiple service gateways in a distributed environment.

BRIEF DESCRIPTION OF THE DRAWINGS

The accompanying drawings herein are used for providing a further understanding of the present disclosure, and constitute a part of the present disclosure. Exemplary embodiments of the present disclosure and descriptions thereof are used for explaining the present disclosure, but do not impose any improper limitations to the present disclosure. In the drawings.

DETAILED DESCRIPTION

Figure 1:
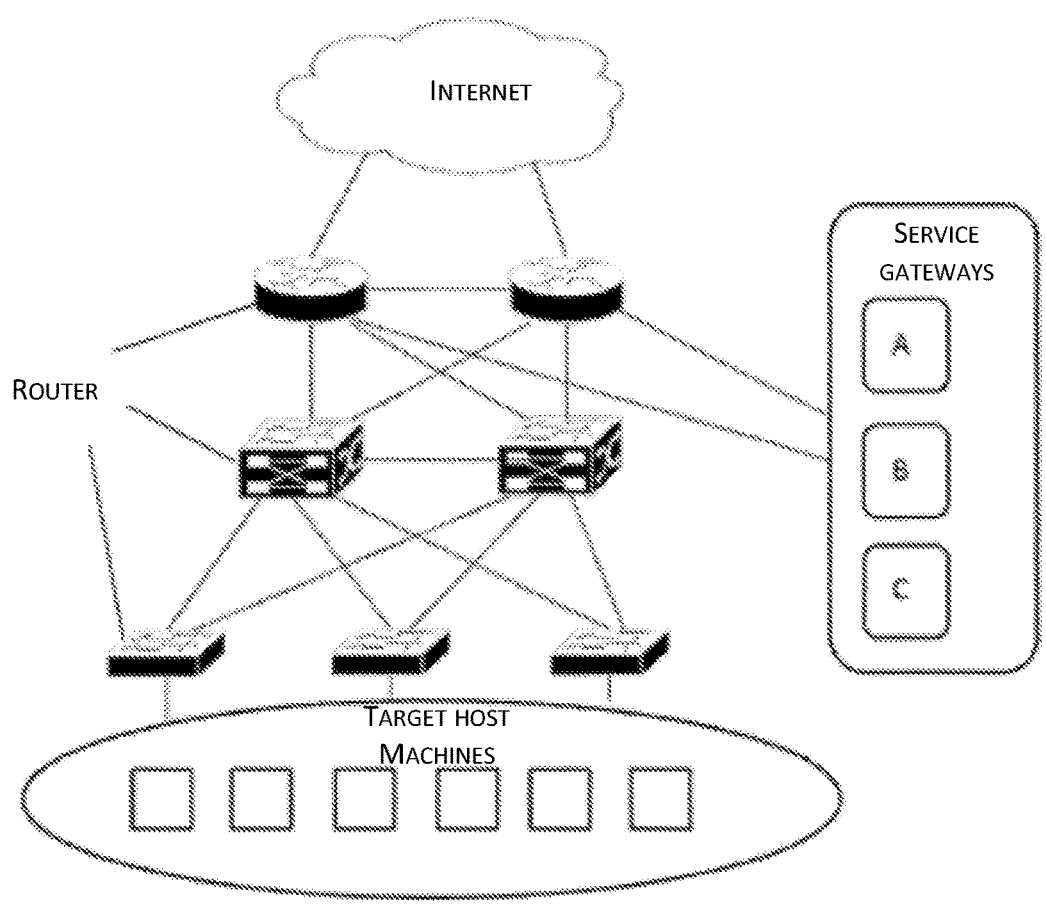
FIG. 1 is a network architecture diagram of a distributed network environment according to the related technologies.

In order to enable one skilled in the art to better understand the solutions of the present disclosure, the technical solutions in the embodiments of the present disclosure will be described clearly and fully hereinafter with reference to the accompanying drawings in the embodiments of the present disclosure. Apparently, the described embodiments merely represent some and not all of the embodiments of the present disclosure. All other embodiments obtained by one of ordinary skill in the art without making any creative effort based on the embodiments in the present disclosure should fall in the protection scope of the present disclosure.

It should be noted that terms such as "first" and "second" in the specification, claims and drawings of the present disclosure are used for distinguishing similar objects, and are not necessarily used for describing a particular order or sequence. It should be understood that, data used in this manner can be interchanged under appropriate circumstances, so that the embodiments of the present disclosure described herein can be implemented in an order other than the orders illustrated or described herein. In addition, terms "include", "have" and any variations thereof are intended to cover non-exclusive inclusion. For example, a process, method, system, product or device including a series of operations or units are not necessarily limited to the operations or units explicitly listed, but may include other operations or units that are not explicitly listed or inherent in the process, method, product or device.

In view of the technical problem of how to ensure that a total traffic of flows (i.e., a total service transmission rate for an identical destination address) limited in parallel satisfies an expected threshold after the flows pass through multiple service gateways in a distributed deployment scenario, two solutions are provided in related technologies:

1. A suitable hash algorithm is selected on an egress router, so that flows are distributed as evenly as possible to each service gateway, and a flow limiting threshold is then allocated to each service gateway after the flows are evenly distributed.

2. A hash algorithm based on a destination IP is selected on an egress router, so that flows arriving at a same destination IP are all processed by a same service gateway, and then actual flow limiting thresholds are configured on corresponding service gateways.

However, the first solution and the second solution both have certain defects.

The first solution relies on a load sharing algorithm that can be supported by a router, and flows can be evenly allocated to each service only after the router supports packet-by-packet load sharing and is configured with the algorithm. However, the packet-by-packet load sharing easily leads to a disorder of packets and occupies processing performance of a server terminal. In addition, the packet-by-packet load sharing cannot be used if flow tables need to be established on service gateways to monitor connection statuses. Besides, the packet-by-packet load sharing cannot ensure that the flows are evenly allocated to each service gateway. As such, if a flow coming in from a service gateway is less than a flow limiting threshold after even allocation, a total traffic after a speed limit is less than an expected flow limiting threshold.

For the second solution, the solution needs to allocate flows of an identical destination IP to a same service gateway for processing. As a result, when a flow of a certain destination IP is relatively large, the processing performance of a corresponding service gateway is easily consumed, thus affecting flows of other destination IPs on the service gateway.

To solve the aforementioned problem, the embodiments of the present disclosure provide a technical solution of controlling a service transmission rate without the need of a particular load sharing approach, which is described in detail hereinafter in combination with specific embodiments.

First Embodiment

According to the embodiments of the present disclosure, a method embodiment of a method for controlling a service transmission rate is provided. It should be noted that operations illustrated in a flowchart of an accompanying drawing can be performed in a computer system such as a set of computer executable instructions. In addition, although a logic order is illustrated in a flowchart, under some circumstances, illustrated or described operations can be performed in an order different from the logic order therein.

Figure 2:
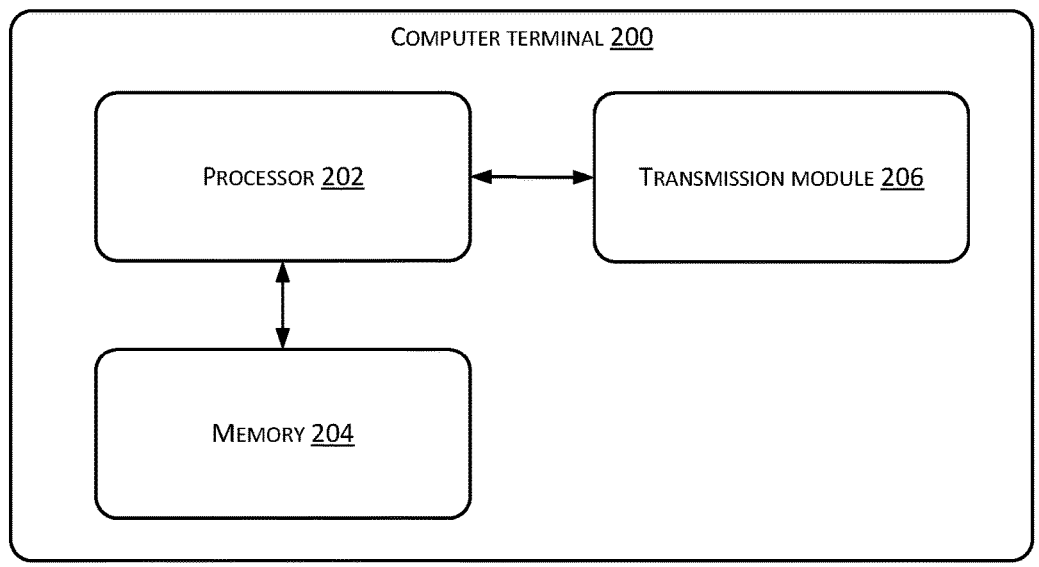
FIG. 2 is a block diagram of a hardware structure of a computer terminal that performs a method for controlling a service transmission rate according to an embodiment of the present disclosure.

The method embodiment provided in the first embodiment of the present application can be performed in a mobile terminal, a computer terminal or a similar computing device. Running on a computer terminal is used as an example. FIG. 2 is a block diagram of a hardware structure of a computer terminal that performs a method for controlling a service transmission rate according to an embodiment of the present disclosure. As shown in FIG. 2, the computer terminal 200 may include one or more (only one is shown in the figure) processors 202 (the processors 202 may include, but are not limited to, processing apparatuses such as a microprocessor MCU or a programmable logic device FPGA), memory 204 configured to store data, and a transmission module 206 configured to implement a communications function. One of ordinary skill in the art can understand that the structure shown in FIG. 2 is illustrative only, which does not pose any limitation to a structure of the above electronic device. For example, the computer terminal 200 may also include more or fewer components as compared to those shown in FIG. 2, or have a configuration different from the one shown in FIG. 2.

The memory 204 can be configured to store software programs and modules of application software, for example, program instructions/modules corresponding to the method for controlling a service transmission rate in the embodiments of the present disclosure. The processor 202 can run the software programs and modules stored in the memory 204, to implement various functional applications and data processing, i.e., implementing the method for detecting application vulnerabilities. The memory 204 may include high-speed random access memory, and may also include nonvolatile memory, for example, one or more magnetic storage devices, flash memories or other nonvolatile solid-state memories. In some examples, the memory 204 may further include memories remotely disposed relative to the processor 202, and these remote memories may be connected to the computer terminal 200 via a network. Examples of the network include, but are not limited to, the Internet, an intranet, a local area network, a mobile communications network, or a combination thereof.

In implementations, the memory 204 may include a form of computer readable media such as a volatile memory, a random access memory (RAM) and/or a non-volatile memory, for example, a read-only memory (ROM) or a flash RAM. The memory 204 is an example of a computer readable media.

The computer readable media may include a volatile or non-volatile type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

The transmission module 206 is configured to receive or send data via a network. A specific example of the network may include a wireless network provided by a communications provider of the computer terminal 200. In an example, the transmission module 206 may include a network interface controller (NIC), which can connect to other network devices via a base station and thus communicate with the Internet. In an example, the transmission module 206 may be a radio frequency (RF) module configured to conduct communications with the Internet wirelessly.

Figure 3:
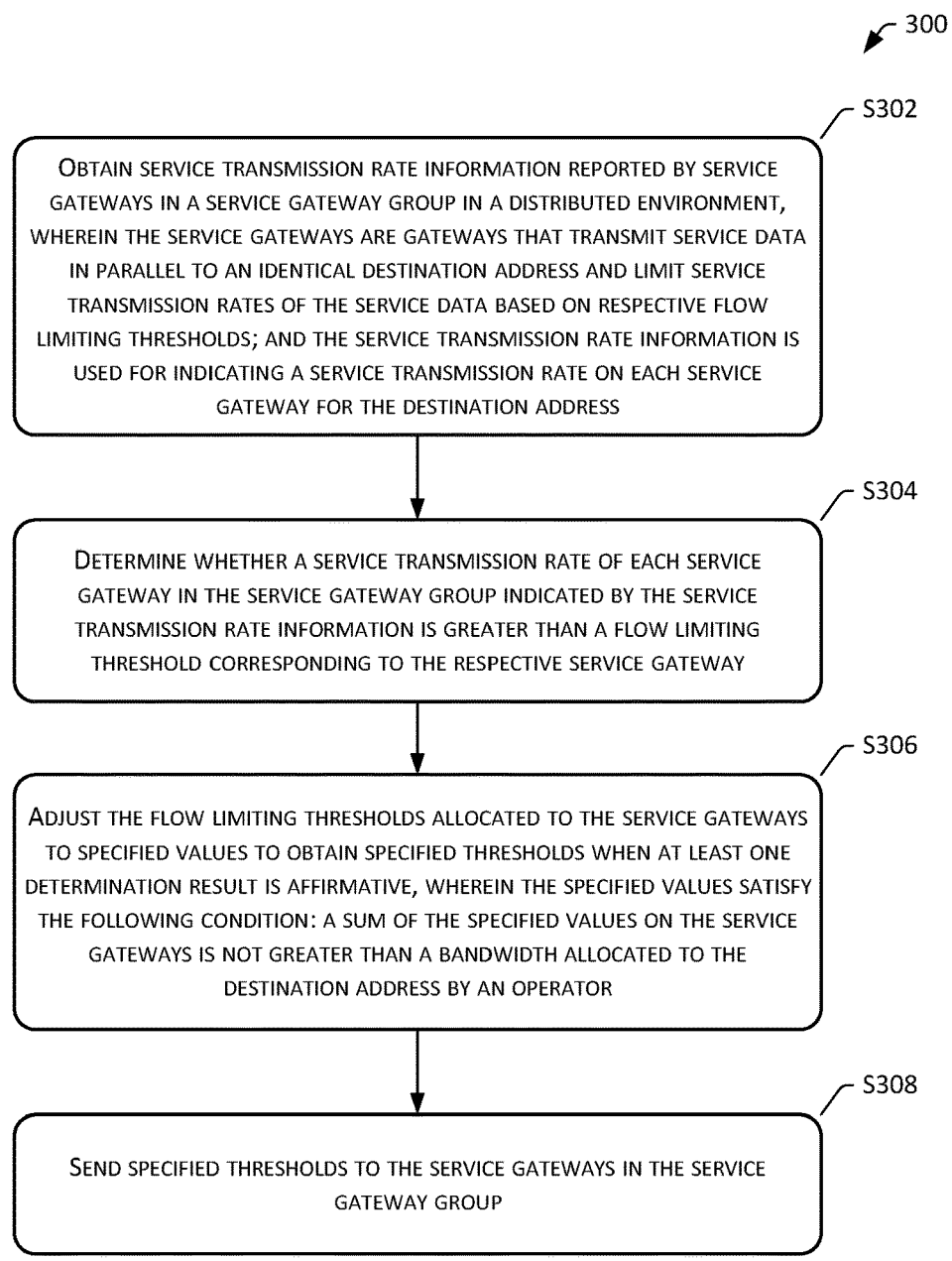
FIG. 3 is a flowchart of a method for controlling a service transmission rate according to the first embodiment of the present disclosure.

The present application provides a method for controlling a service transmission rate as shown in FIG. 3 in the foregoing running environment. FIG. 3 is a flowchart of a method 300 for controlling a service transmission rate according to the first embodiment of the present disclosure. As shown in FIG. 3, the method 300 includes operations S302 to S308.

Operation S302 obtains service transmission rate information reported by service gateways in a service gateway group in a distributed environment, wherein the service gateways are gateways that transmit service data in parallel to an identical destination address and limit service transmission rates of the service data based on respective flow limiting thresholds; and the service transmission rate information is used for indicating a service transmission rate on each service gateway for the destination address.

In an optional embodiment, a service transmission rate for an identical destination address may be represented by a sum of rates on the service gateways configured to distribute and transmit flows of service data for the destination address. For example, the number of service gateways in a gateway group that distribute and transmit flows for service data of an identical destination address is five, and service transmission rates on these five service gateways for the destination address are 10 k/s, 20 k/s, 40 k/s, 50 k/s, and 70 k/s respectively. Then, a service transmission rate of the destination address is (10+20+40+50+70) k/s, i.e., 190 k/s.

Optionally, in this operation, the service transmission rate information can be acquired in many manners. For example, when a centralized control solution is used, the service transmission rate information reported by the service gateways in the service gateway group can be received through a centralized control device (i.e., a control center). When a distributed control solution is used, the service transmission rate information can be received by a service gateway selected from the service gateway group based on a preset rule (e.g., using a hash algorithm).

It should be noted that the service gateways in the service gateway group in the embodiments of the present disclosure can receive service data from a plurality of destination addresses at the same time. In the embodiments of the present disclosure, for ease of description, only a service transmission rate of service data for an identical destination address can be considered, but the present disclosure is not limited to the implementations shown in the embodiments of the present disclosure.

In an optional embodiment, the service transmission rate information may be represented as a value that indicates a magnitude of a service transmission rate, and may also be represented as a piece of indication information. The indication information is used to indicate the service transmission rate. For example, the service transmission rate is obtained using a locally stored mapping table (the mapping table stores a correspondence relationship between the indication information and the service transmission rate).

It should be noted that the service gateway group consists of service gateways in a distributed environment, which may be service gateways that distribute flows of service data of an identical destination address, i.e., service gateways for sharing flows (which may be manifested as service data) of an identical destination address.

Operation S304 determines whether a service transmission rate of each service gateway in the service gateway group indicated by the service transmission rate information is greater than a flow limiting threshold corresponding to the respective service gateway.

Optionally, the flow limiting thresholds may be preset, and may also be pre-allocated by the service gateways. The latter may be manifested by the following implementation: allocating the flow limiting thresholds to the service gateways in the service gateway group before the service transmission rate information reported by the service gateway group in the distributed environment is acquired, wherein the flow limiting thresholds allocated to the service gateways are the same.

Operation S306 adjusts the flow limiting thresholds allocated to the service gateways to specified values to obtain specified thresholds when at least one determination result is affirmative, wherein the specified values satisfy the following condition: a sum of the specified values on the service gateways is not greater than a bandwidth allocated to the destination address by an operator. As such, as the sum of the specified values is not greater than the bandwidth allocated to the destination address by the operator, the service transmission rate of the destination address can be ensured not to exceed the bandwidth. In fact, the sum of the flow limiting thresholds allocated to the service gateways is generally determined based on the bandwidth allocated to the destination address by the operator, i.e., the sum of the flow limiting thresholds is not greater than the bandwidth.

In an optional embodiment, the specified thresholds can be determined based on the following processing procedure: calculating a ratio between the service transmission rate on each service gateway and a total service transmission rate, where the total service transmission rate is calculated and obtained by performing an AND operation on the service transmission rates on all the service gateways in the service gateway group for the destination address; and determining a specified threshold reallocated to each service gateway in the service gateway group based on the ratio and the bandwidth. Specifically, a principle of the foregoing process of implementation may be represented by using the following formula:

$$Th=(x/S)*B,$$

where Th denotes a specified threshold; x denotes a service transmission rate on each service gateway in a service gateway group; S denotes a total service transmission rate, B denotes a constant equal to a bandwidth allocated to a destination address by an operator, which may also be manifested as a sum of flow limiting thresholds on service gateways in the service gateway group for the destination address.

In addition, as can be seen from the foregoing content, flow limiting thresholds and specified thresholds are not specified to one device, but are specified to all service gateways in a service gateway group corresponding to a destination address, i.e., the flow limiting thresholds and the specified thresholds can be understood as a group of thresholds or a type of thresholds.

Operation S308 sends specified thresholds to the service gateways in the service gateway group. As such, the service gateways can limit the service transmission rates for the destination address based on the specified thresholds, thereby achieving a flow limitation.

In an optional embodiment, the service gateways may be real service gateway devices or service units that can operate independently in a distributed device. The latter may be manifested as a device having a plurality of independent CPUs, or a line card plug-in device having a plurality of line cards. In addition, the service gateways can support limitations to service transmission rates of a plurality of destination addresses at the same time.

It should be noted that a destination address in the embodiments of the present disclosure can be, but is not limited to, manifested as an IP address, or an identifier for indicating an IP address, etc.

As described above, operation S302 can be implemented through a centralized control solution and a distributed control solution. In fact, the method for controlling a service transmission rate provided in the embodiments of the present disclosure may also be applied in a centralized control device in a distributed environment or a specified service gateway in a service gateway group, wherein the centralized control device is a device in the distributed environment other than the service gateways in the service gateway group.

The centralized control device may be, but is not limited to, a type of device newly added in the distributed environment, or another device that can implement centralized control. The specified service gateway is determined using the following approach: performing a hash operation on the destination address to obtain a hash value corresponding to the destination address; and selecting a service gateway corresponding to the hash value from the service gateway group as the specified service gateway.

The hash algorithm is used for converting an input (also referred to as a pre-image) of an arbitrary length to an output of a fixed length, wherein the output is a hash value. This type of conversion is a type of compressed mapping. In other words, the space of the hash value is generally much smaller than the space of the input, and different inputs may be hashed into a same output.

In an optional embodiment, the foregoing process of selection may be implemented using the following approach:

Calculation of flows (i.e., service transmission rates) of different destination IPs is shared among the service gateways through a hash algorithm f(key). A key in an algorithm function herein, i.e., an input parameter, is a destination IP address. For example, if there are a total of four service gateways, a hash algorithm of a folding method can be used to convert a 32-bit destination IP address into a 2-bit hash value. A destination IP with a hash value as 0 sends flow data thereof to a service gateway A. A destination IP with a hash value as 1 sends flow data thereof to a service gateway B. A destination IP with a hash value as 2 sends flow data thereof to a service gateway C. A destination IP with a hash value as 3 sends flow data thereof to a service gateway D.

It should be noted that the two above control solutions are merely different in control logics, i.e., one is a centralized control and the other is a distributed control. However, main design ideas of these two control approaches are the same, i.e., a corresponding flow limiting threshold (i.e., a threshold that limits a service transmission rate) is dynamically adjusted based on a magnitude of a flow (i.e., a service transmission rate) on each service gateway. These two control solutions are described in detail hereinafter in conjunction with specific embodiments.

First Solution: Centralized Control Solution

Figure 4:
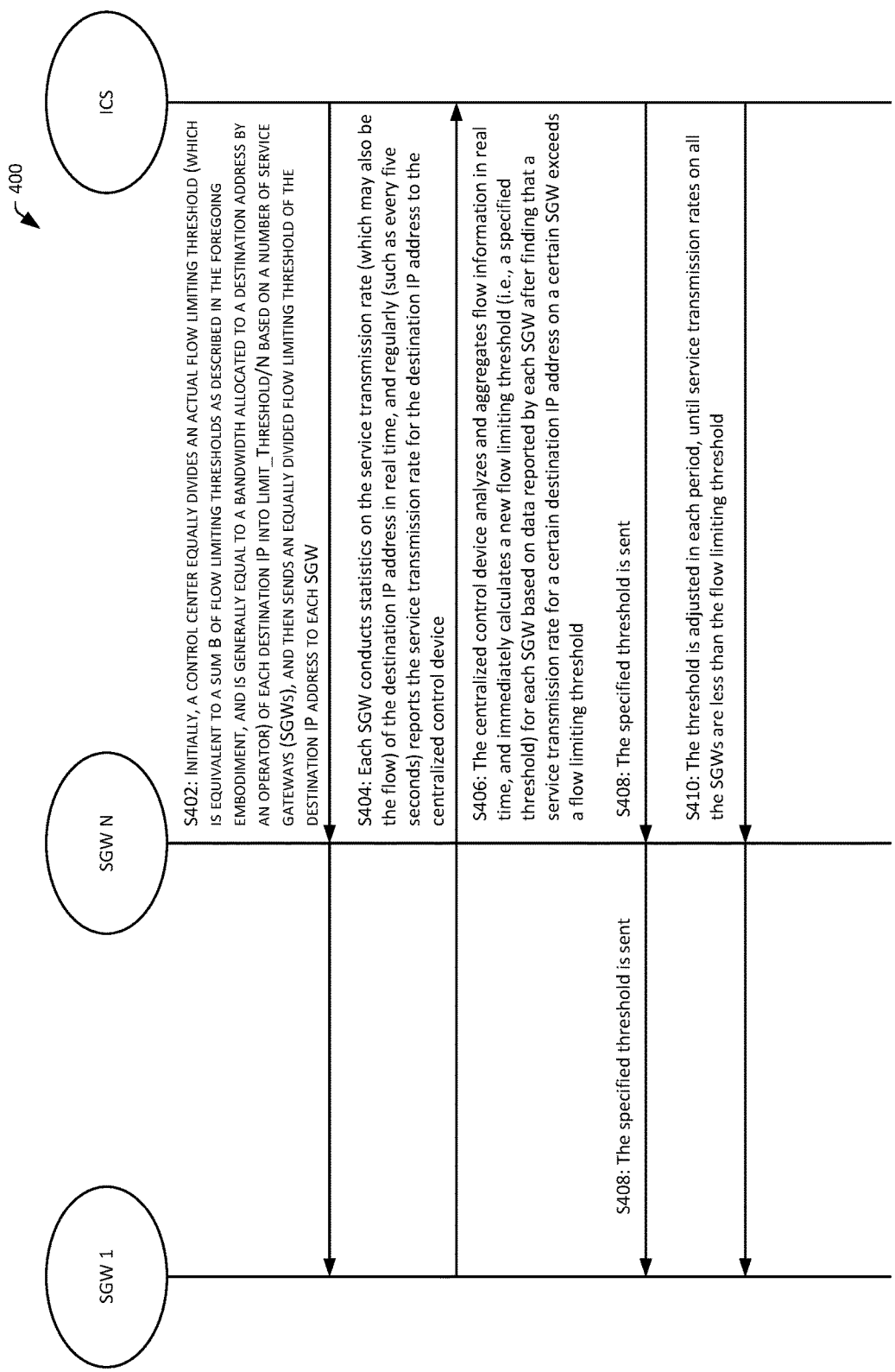
FIG. 4 is a schematic flowchart of an optional method for controlling a service transmission rate based on a centralized control solution according to an embodiment of the present disclosure.

In this control solution, data collection, and real-time calculation and sending of thresholds are all implemented in a centralized control center (i.e., a centralized control device). Each service gateway regularly reports a magnitude of a flow (i.e., a magnitude of a service transmission rate) of each destination IP to the control device. As shown in FIG. 4, details of a process of implementation of the control solution 400 are as follows:

S402: Initially, a control center equally divides an actual flow limiting threshold (which is equivalent to a sum B of flow limiting thresholds as described in the foregoing embodiment, and is generally equal to a bandwidth allocated to a destination address by an operator) of each destination IP into Limit_Threshold/N based on a number of service gateways (SGWs), and then sends an equally divided flow limiting threshold (i.e., the flow limiting threshold in the embodiment shown in FIG. 3) of the destination IP address to each SGW, where N represents a number of SGWs and is a positive integer.

S404: Each SGW conducts statistics on the service transmission rate (which may also be the flow) of the destination IP address in real time, and regularly (such as every five seconds) reports the service transmission rate for the destination IP address to the centralized control device.

S406: The centralized control device analyzes and aggregates flow information in real time, and immediately calculates a new flow limiting threshold (i.e., a specified threshold) for each SGW based on data reported by each SGW after finding that a service transmission rate for a certain destination IP address on a certain SGW exceeds a flow limiting threshold. A calculation method includes: with an assumption of service transmission rates for a destination IP reported by each SGW being DIP_SGW1_Rate, DIP_SGW2_Rate and DIP_SGWN_Rate respectively, adding service transmission rates to obtain a total transmission rate (DIP_Total_Rate) for a destination IP address and then calculating a specified threshold based on a ratio of a rate carried on each SGW. For example, a specified threshold on SGW1 is (DIP_SGW1_Rate/DIP_Total_Rate)*Limit_Threshold, and a corresponding specified threshold of each SGW is sent to a corresponding SGW, wherein Limit_Threshold is a total threshold for the destination IP address, which can be a bandwidth allocated to the destination IP address by the operator. For example, a bandwidth that corresponds to the destination IP address and is customized by a user is 10 M/s. In this case, the total threshold, Limit_Threshold, is 10 M/s. Besides, a sum of DIP_SGW1_Rate, DIP_SGW2_Rate, . . . and DIP_SGWN_Rate does not exceed 10 M/s.

S408: The specified threshold ((DIP_SGW1_Rate/DIP_Total_Rate)*Limit_Threshold) is sent such that the SGW limits a flow according to the specified threshold (i.e., limits a service transmission rate on the SGW for the destination IP address).

S410: Operations S402 to S408 are repeated, i.e., the threshold is adjusted in each period, until service transmission rates on all the SGWs are less than the flow limiting threshold (i.e., a total service transmission rate outputted on the SGWs for the destination IP address is less than the flow limiting threshold).

A SGW in FIG. 4 represents a service gateway or a service unit independently operating in a distributed device, and ICS represents a centralized control system, i.e., a control device.

Figure 5:
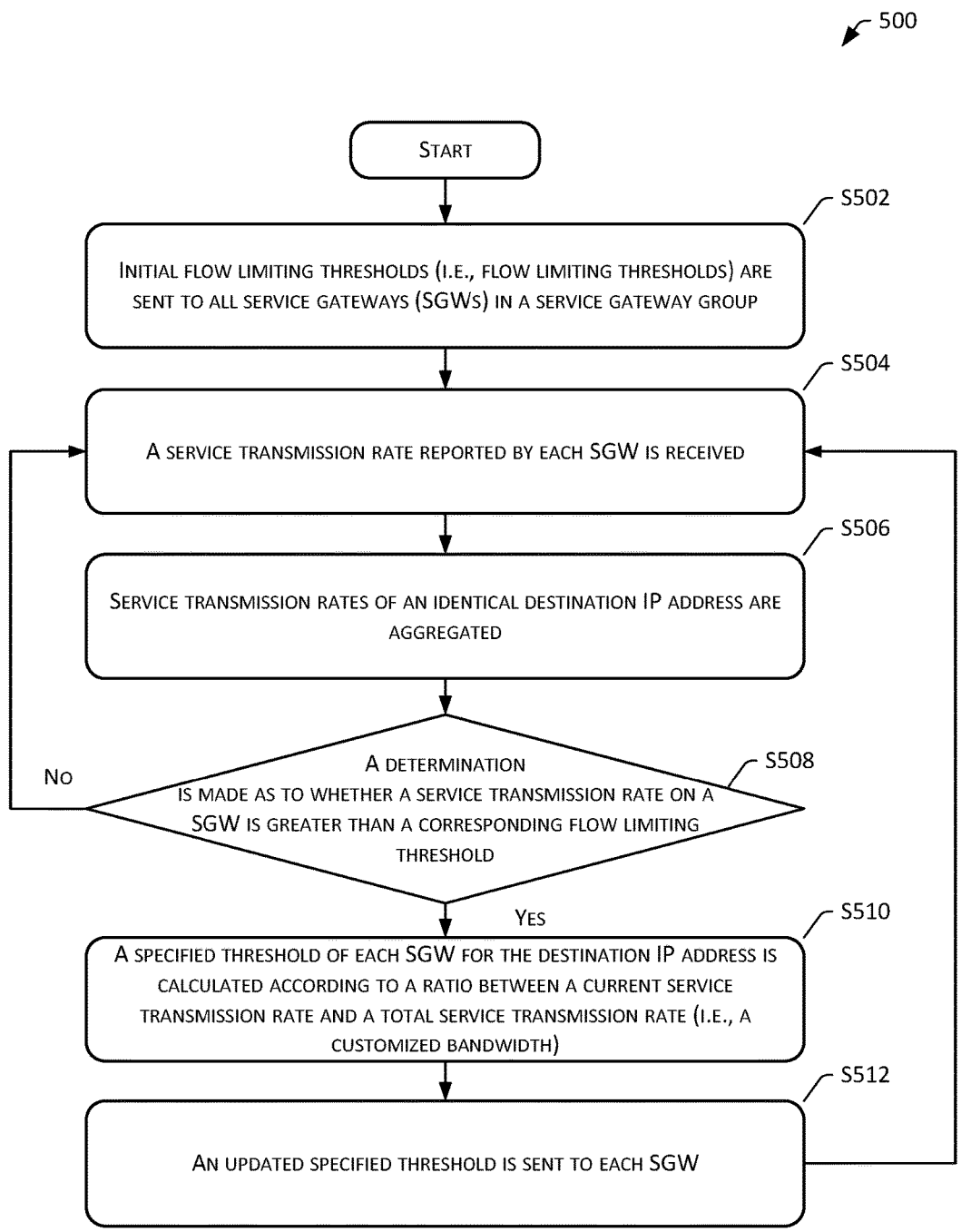
FIG. 5 is a schematic diagram of an optional process for controlling a service transmission rate based on a centralized control solution according to an embodiment of the present disclosure.

A control process 500 for a centralized control device is shown in FIG. 5, and includes the following processing operations.

Operation S502: Initial flow limiting thresholds (i.e., flow limiting thresholds) are sent to all service gateways (SGWs) in a service gateway group.

Operation S504: A service transmission rate reported by each SGW is received.

Operation S506: Service transmission rates of an identical destination IP address are aggregated.

Operation S508: A determination is made as to whether a service transmission rate on a SGW is greater than a corresponding flow limiting threshold, and operation S510 is performed if affirmative, or operation S504 is performed otherwise.

Operation S510: A specified threshold of each SGW for the destination IP address is calculated according to a ratio between a current service transmission rate and a total service transmission rate (i.e., a customized bandwidth).

Operation S512: An updated specified threshold is sent to each SGW.

Figure 6:
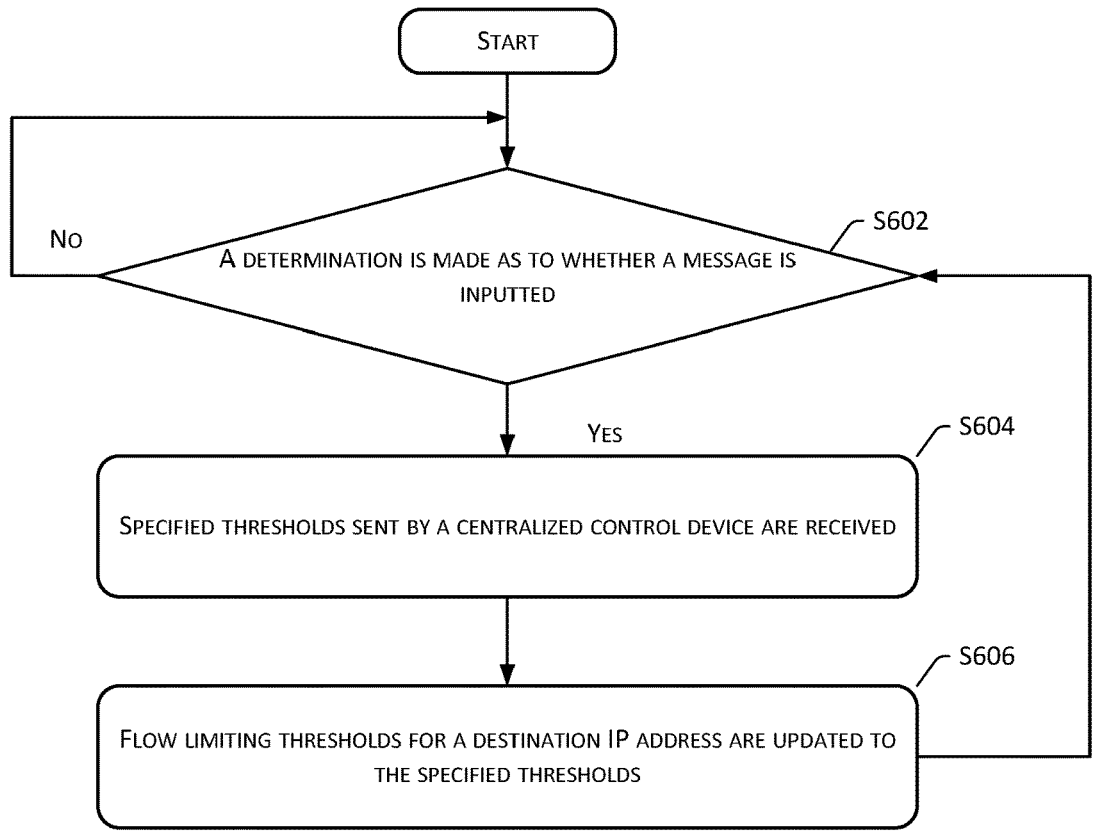
FIG. 6 is a schematic diagram of an optional control plane handling process based on service gateways (SGWs) in a centralized control solution according to an embodiment of the present disclosure.

A control plane handling process 600 on each SGW is shown in FIG. 6, which includes the following processing operations.

Operation S602: A determination is made as to whether a message is inputted, and operation S604 is performed if affirmative, or the process waits otherwise.

Operation S604: Specified thresholds sent by a centralized control device are received.

Operation S606: Flow limiting thresholds for a destination IP address are updated to the specified thresholds.

Figure 7:
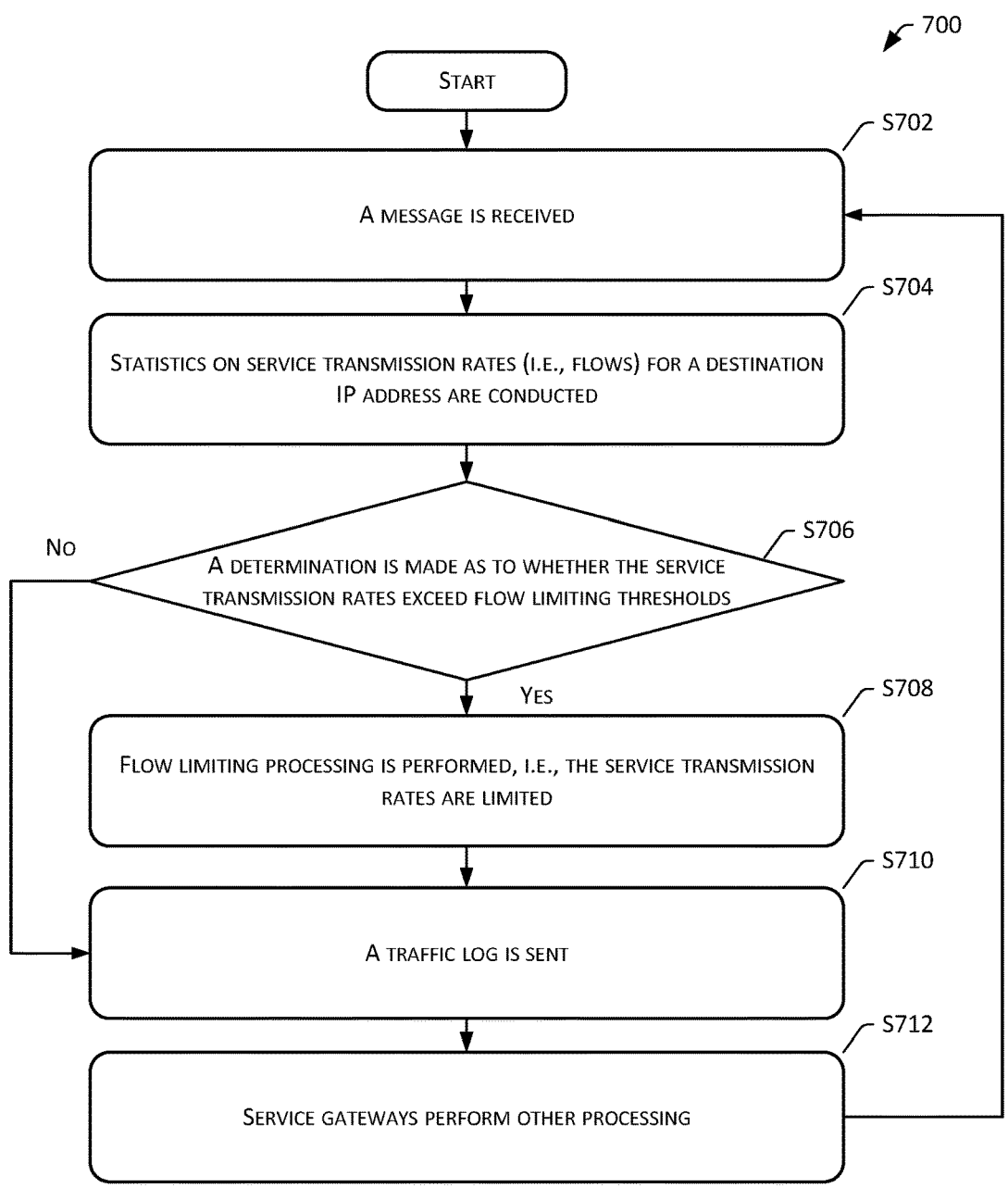
FIG. 7 is a schematic diagram of an optional data plane handling process based on SGWs in a centralized control solution according to an embodiment of the present disclosure.

A data plane handling process 700 on each SGW is shown in FIG. 7, which includes the following processing operations.

Operation S702: A message is received.

Operation S704: Statistics on service transmission rates (i.e., flows) of a destination IP address are conducted.

Operation S706: A determination is made as to whether the service transmission rates exceed flow limiting thresholds, and operation S708 is performed if affirmative, or operation S702 is performed otherwise.

Operation S708: Flow limiting processing is performed, i.e., the service transmission rates are limited.

Operation S710: A traffic log is sent.

Operation S712: Service gateways perform other processing, and operation S704 is performed, wherein the other processing herein may be manifested as data forwarding, etc. For example, when the service gateways are firewall devices, the other processing may be manifested as a network address translation (NAT) and a virtual private network (VPN) access.

Second Solution: Distributed Control Solution

Figure 8:
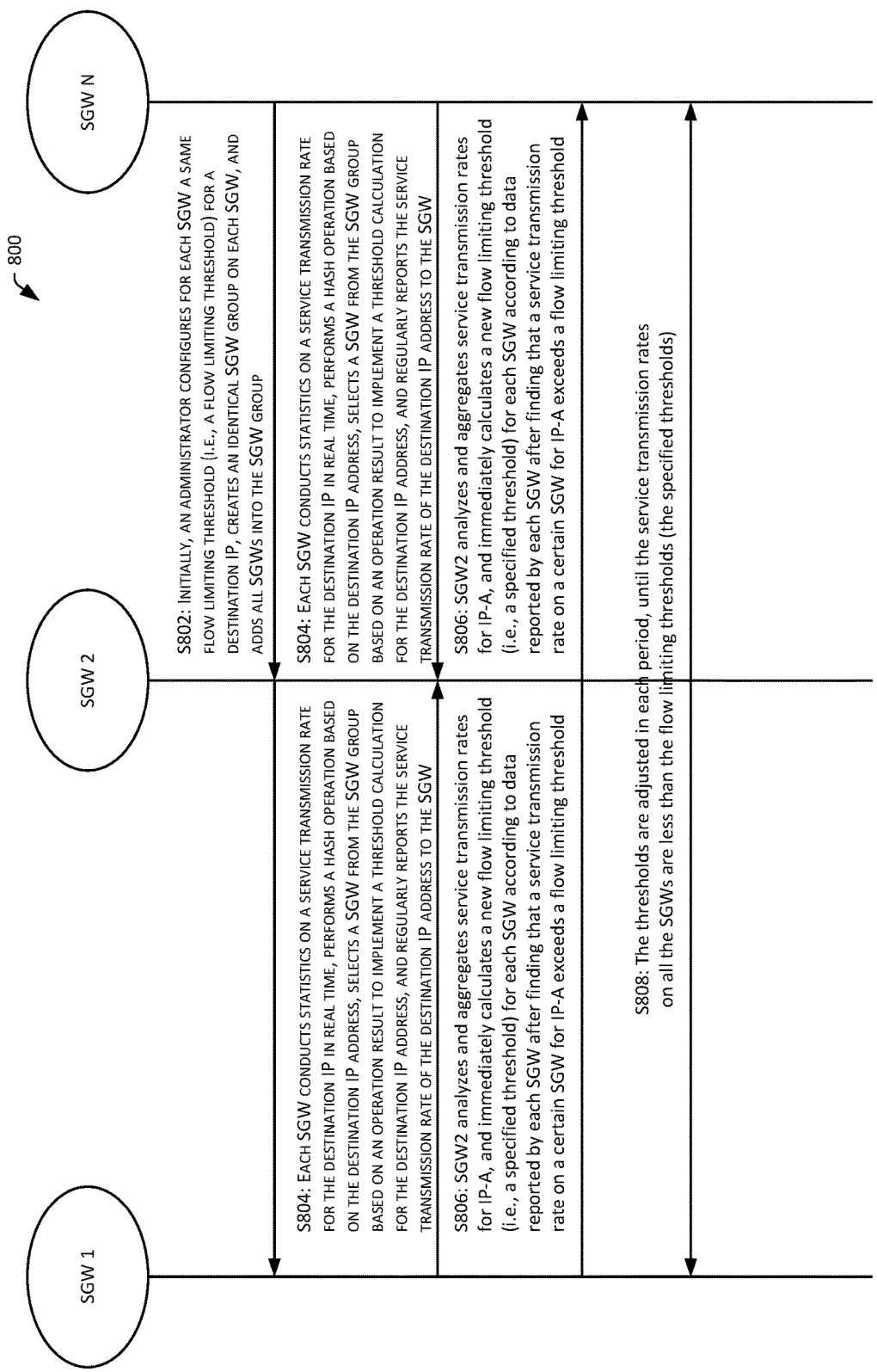
FIG. 8 is a schematic diagram of an optional process for controlling a service transmission rate based on a distributed control solution according to an embodiment of the present disclosure.

Data collection, real-time calculation and threshold sending of different destination IPs are distributed among different service gateways for implementations through a hashing approach. At the same time, calculation of thresholds of an identical destination IP is ensured to be centralized on a service gateway for processing, and traffic logs of other service gateways for the destination IP are all reported to the service gateway. As shown in FIG. 8, details of a process 800 of implementation are as follows.

S802: Initially, an administrator configures for each SGW a same flow limiting threshold (i.e., a flow limiting threshold) for a destination IP, creates an identical SGW group on each SGW, and adds all SGWs into the SGW group.

Operation S804: Each SGW conducts statistics on a service transmission rate for the destination IP in real time, performs a hash operation based on the destination IP address, selects a SGW from the SGW group based on an operation result to implement a threshold calculation for the destination IP address, and regularly reports the service transmission rate of the destination IP address to the SGW. For example, each SGW sends a service transmission rate for a destination IP address which is IP-A to SGW2 (IP-A and SGW2 are used as examples in the following operations for description).

Operation S806: SGW2 analyzes and aggregates service transmission rates for IP-A, and immediately calculates a new flow limiting threshold (i.e., a specified threshold) for each SGW according to data reported by each SGW after finding that a service transmission rate on a certain SGW for IP-A exceeds a flow limiting threshold. A calculation method includes: with an assumption of service transmission rates of IP-A reported by each SGW being DIP_SGW1_Rate, DIP_SGW2_Rate, and DIP_SGWN_Rate respectively, adding the service transmission rates to obtain a total flow rate (represented as DIP_Total_Rate) for IP-A, and then calculating a new flow limiting threshold based on a proportion of a flow carried on each SGW (i.e., a proportion of a service transmission rate in a total flow rate). For example, a flow limiting threshold on SGW1 is (DIP_SGW1_Rate/DIP_Total_Rate)*Limit_Threshold, and a corresponding flow limiting threshold of each SGW is sent to the corresponding SGW.

Operation S808: Operations S804 to S808 are repeated, i.e., the thresholds are adjusted in each period, until the service transmission rates on all the SGWs are less than the flow limiting thresholds (the specified thresholds).

Figure 9:
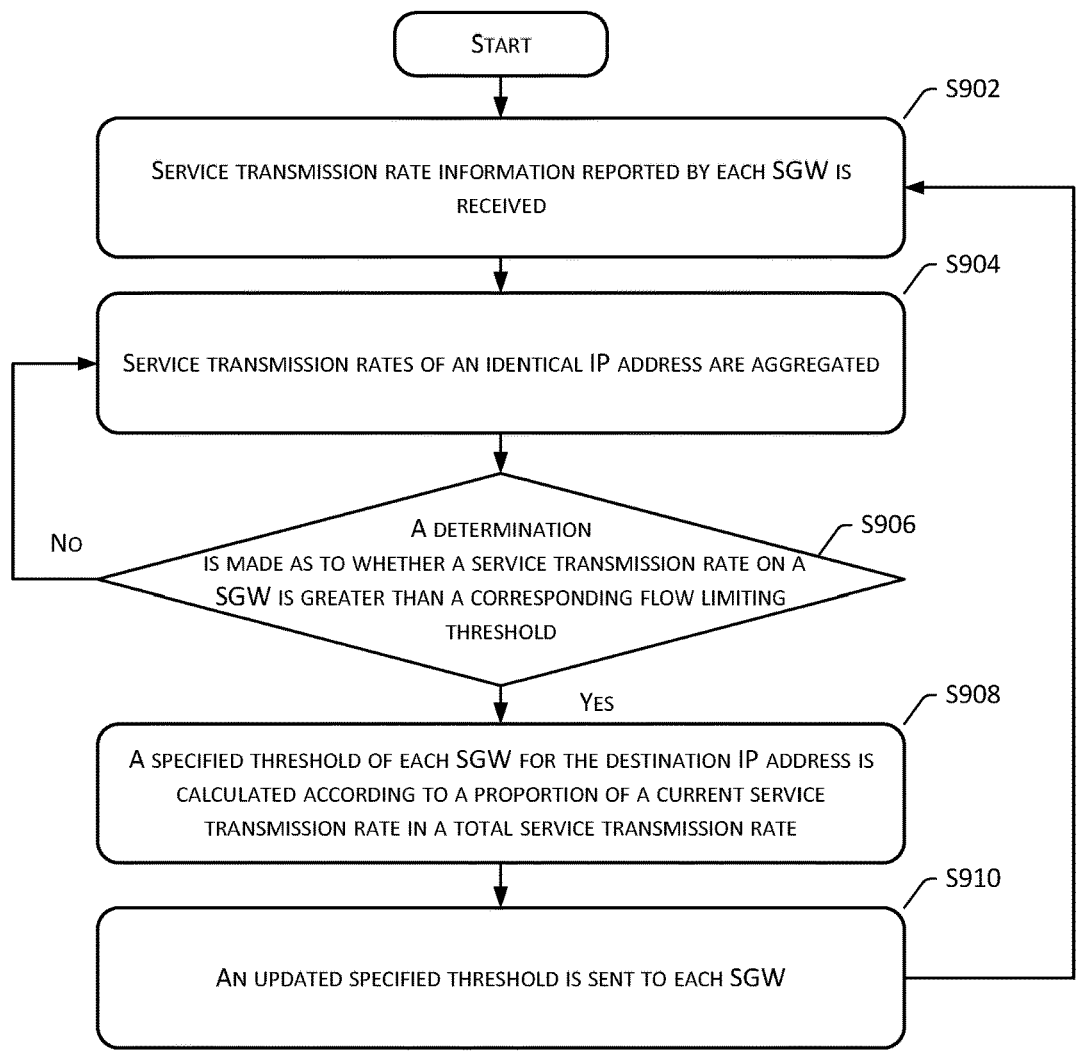
FIG. 9 is a schematic diagram of an optional control plane handling process based on SGWs in a distributed control solution according to an embodiment of the present disclosure.

A control plane handling process 900 on each SGW is shown in FIG. 9, which includes the following operations.

Operation S902: Service transmission rate information reported by each SGW is received.

Operation S904: Service transmission rates of an identical IP address are aggregated.

Operation S906: A determination is made as to whether a service transmission rate on a SGW is greater than a corresponding flow limiting threshold (i.e., the flow limiting threshold), and operation S908 is performed if affirmative, or operation S902 is performed otherwise.

Operation S908: A specified threshold of each SGW for the destination IP address is calculated according to a proportion of a current service transmission rate in a total service transmission rate.

Operation S910: An updated specified threshold is sent to each SGW.

Figure 10:
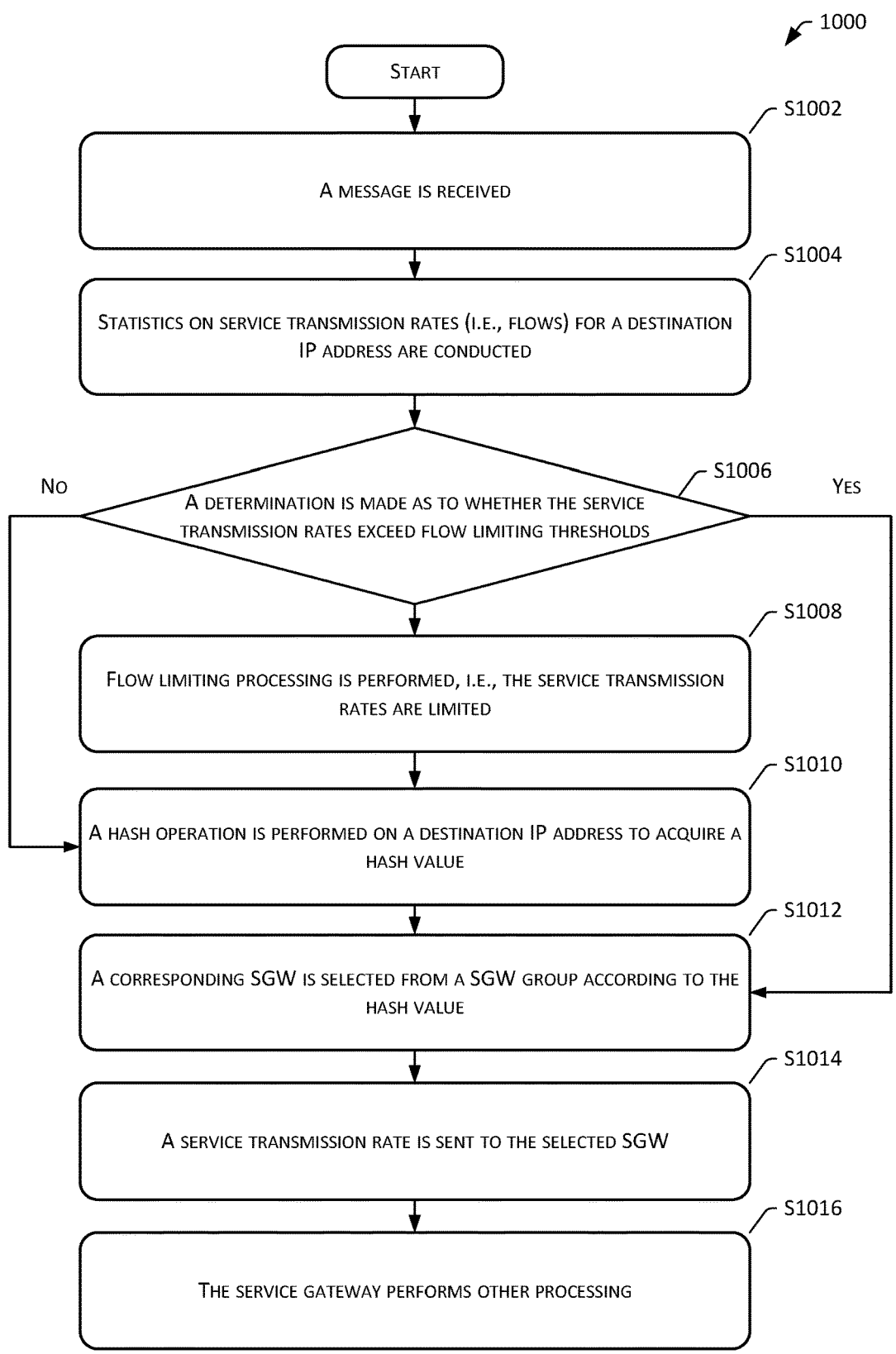
FIG. 10 is a schematic diagram of an optional data plane handling process based on SGWs in a distributed control solution according to an embodiment of the present disclosure.

A data plane handling process 1000 on each SGW is shown in FIG. 10, which includes the following operations.

Operation S1002: A message is received.

Operation S1004: Statistics on service transmission rates (i.e., flows) for a destination IP address are conducted.

Operation S1006: A determination is made as to whether the service transmission rates exceed flow limiting thresholds, and operation S1008 is performed if affirmative, or operation S1010 is performed otherwise.

Operation S1008: Flow limiting processing is performed, i.e., the service transmission rates are limited.

Operation S1010: A hash operation is performed on a destination IP address to acquire a hash value.

Operation S1012: A corresponding SGW is selected from a SGW group according to the hash value.

Operation S1014: A service transmission rate is sent to the selected SGW.

Operation S1016: The service gateway performs other processing.

It should be noted that the foregoing method embodiments are all described as a series of combinations of actions for the sake of description. However, one skilled in the art should understand that the present disclosure is not limited to the described orders of actions, because some operations may be performed in another order or in parallel according to the present disclosure. In addition, one skilled in the art should also understand that the embodiments described in this specification are all exemplary embodiments, and actions and modules involved therein are not necessarily mandatory to the present disclosure.

Based on the foregoing descriptions of the implementation manners, one skilled in the art may clearly understand that the methods according to the foregoing embodiments may be implemented by software plus a necessary universal hardware platform, and may also be implemented by hardware. However, the former is a more desirable implementation in most cases. Based on such understanding, the essence of the technical solutions of the present disclosure, or the parts contributing to the existing technologies may be embodied in a form of a software product. The software product may be stored in a storage media (such as a ROM/RAM, a magnetic disk, or an optical disc) and include instructions that cause a terminal device (which may be a mobile phone, a computer, a server, a network device, etc.) to execute the methods in the embodiments of the present disclosure.

Second Embodiment

Figure 11:
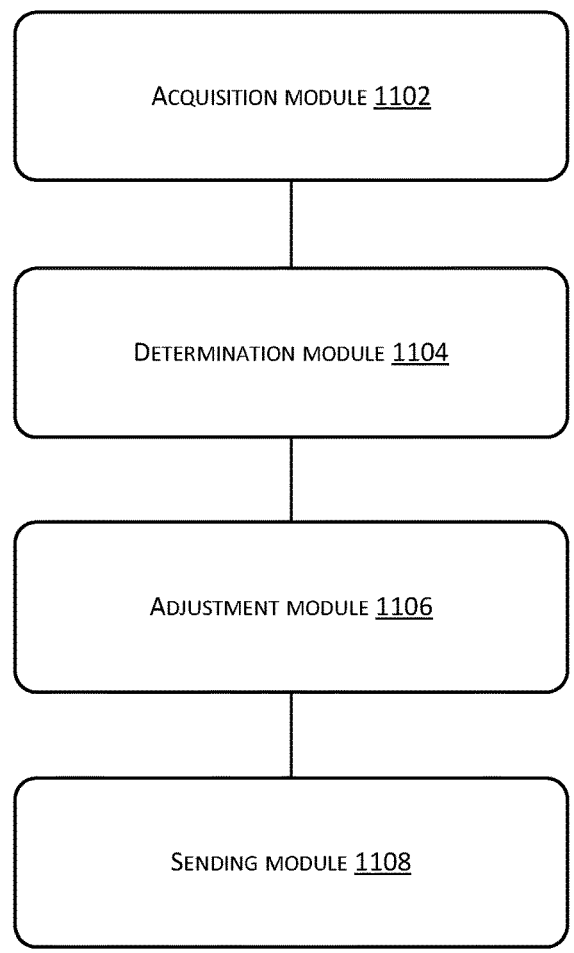
FIG. 11 is a schematic structural diagram of an apparatus for controlling a service transmission rate according to an embodiment of the present disclosure.

According to the embodiments of the present disclosure, an apparatus for implementing a method for controlling a service transmission rate is further provided. The apparatus may be applied to a computer terminal. However, accomplished functions or the structure of the computer terminal may not be limited to the computer terminal in the first embodiment. For example, the computer terminal in the present embodiment may be manifested as a centralized control device or a specified service gateway in a SGW group in the first embodiment. Details thereof may be referenced to the description of the first embodiment, and are not repeatedly described herein. As shown in FIG. 11, the apparatus 1100 includes the following.

An acquisition module 1102 is configured to acquire service transmission rate information reported by service gateways in a service gateway group in a distributed environment, wherein the service gateways are gateways that transmit service data to an identical destination address in parallel and limit service transmission rates of the service data based on respective flow limiting thresholds, the service transmission rate information being used for indicating a service transmission rate on each service gateway for the destination address.

A determination module 1104, which is connected to the acquisition module 1102, is configured to determine whether the service transmission rate of each service gateway in the service gateway group indicated by the service transmission rate information is greater than a flow limiting threshold corresponding to the respective service gateway.

An adjustment module 1106, which is connected to the determination module 1104, is configured to adjust the flow limiting thresholds allocated to the service gateways to specified values to obtain specified thresholds when at least one determination result outputted by the judgment module 1104 is affirmative, wherein the specified values satisfy the following condition: a sum of the specified values on the service gateways is not greater than a bandwidth to the destination address allocated by an operator.

A sending module 1108, which is connected to the adjustment module 1106, is configured to send the specified thresholds to the service gateways.

Through the functions implemented by the modules, the objective of limiting service transmission rates of a destination address can also be achieved, thus ensuring that a total traffic of parallel flows (i.e., a total service transmission rate for an identical destination address) with limitation satisfies an expected threshold after the flows pass through multiple service gateways.

Figure 12:
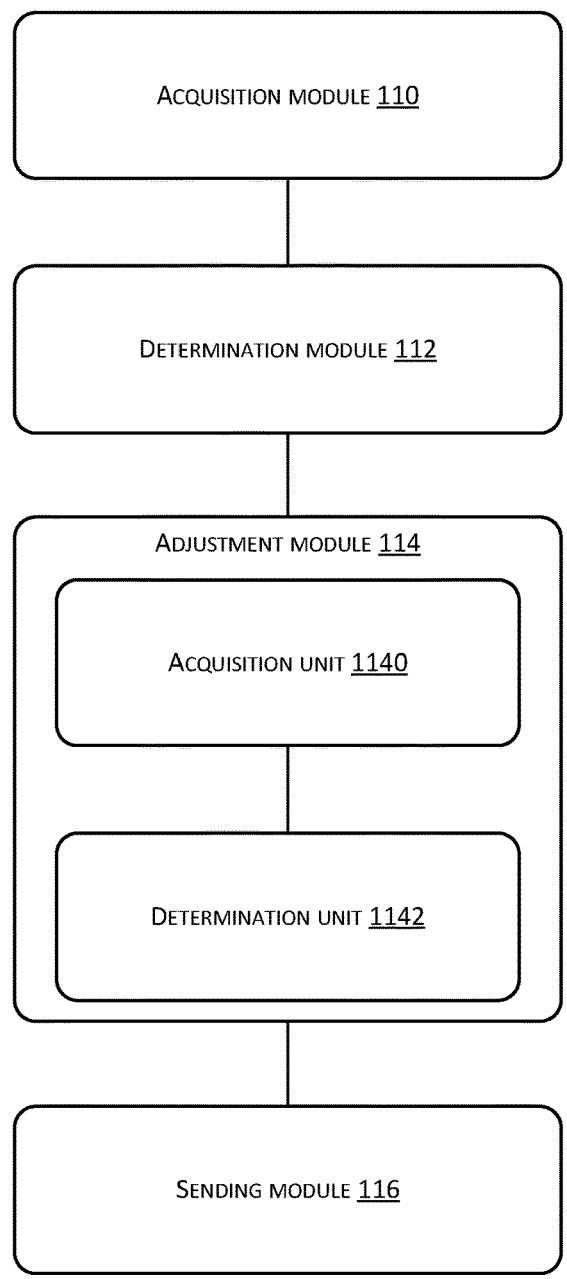
FIG. 12 is another schematic structural diagram of an optional apparatus for controlling a service transmission rate according to an embodiment of the present disclosure.

Optionally, as shown in FIG. 12, the adjustment module 1106 may include the following processing units.

An acquisition unit 1202 is configured to acquire a ratio between the service transmission rate on each service gateway and a total service transmission rate, where the total service transmission rate is obtained by performing an AND operation on the service transmission rates on all the service gateways in the service gateway group for the destination address. A determination unit 1204, which is connected to the acquisition unit 1202, is configured to determine the specified thresholds reallocated to the service gateways in the service gateway group based on the ratio and the bandwidth.

It should be noted that optional embodiments of the present embodiment can be referenced to the embodiments in the methods for controlling a service transmission rate in the first embodiment, and are not repeatedly described herein.

In addition, the modules involved in the present embodiment may be implemented by software or hardware. The latter may be, but is not limited to, manifested in the following forms: the modules all being located in a same processor, the modules being located in different processors, or the modules being located in multiple processors in a form of any combination.

Third Embodiment

Figure 13:
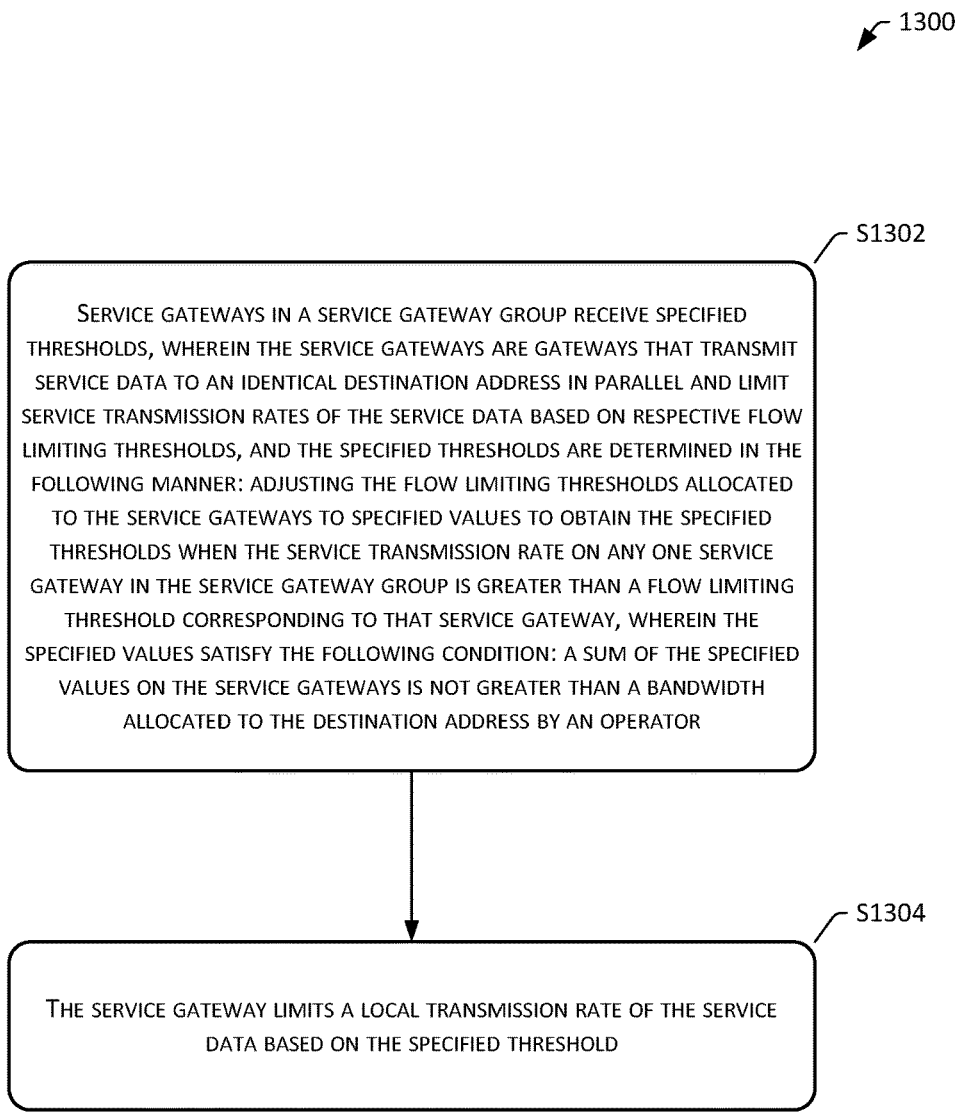
FIG. 13 is a schematic flowchart of another optional method for controlling a service transmission rate according to an embodiment of the present disclosure.

The present embodiment provides a method 1300 for controlling a service transmission rate on a side of a service gateway. As shown in FIG. 13, the method 1300 includes:

Operation S1302: Service gateways in a service gateway group receive specified thresholds, wherein the service gateways are gateways that transmit service data to an identical destination address in parallel and limit service transmission rates of the service data based on respective flow limiting thresholds, and the specified thresholds are determined in the following manner:

adjusting the flow limiting thresholds allocated to the service gateways to specified values to obtain the specified thresholds when the service transmission rate on any one service gateway in the service gateway group is greater than a flow limiting threshold corresponding to that service gateway, wherein the specified values satisfy the following condition: a sum of the specified values on the service gateways is not greater than a bandwidth allocated to the destination address by an operator.

Operation S1304: The service gateway limits a local transmission rate of the service data based on the specified threshold.

In an optional embodiment, a specified threshold can be determined using the following approach:

$$Th=(x/S)*B,$$

where Th denotes a specified threshold, x denotes a service transmission rate on each service gateway in a service gateway group, and S denotes a total service transmission rate, wherein the total service transmission rate is obtained by performing an AND operation on transmission rates on all service gateways in the service gateway group for a destination address.

Optionally, the method for controlling a service transmission rate provided in the embodiments of the present disclosure can be implemented by a control center or a specified service gateway in a service gateway group. For example, before service gateways in a service gateway group receive specified thresholds, the service gateways report local service transmission rates for a destination address to a centralized control device in a distributed environment or a specified service gateway in the service gateway group. In fact, the foregoing processing procedure of the present embodiment embodies two control solutions: a centralized control solution and a distributed control solution. Reference may be made to the description of the first embodiment for details of the implementations of these two control solutions, and details thereof are not repeatedly described herein.

Optionally, before a service gateway in the service gateway group receives a specified threshold, the service gateway acquires a flow limiting threshold and the flow limiting thresholds is set for the service gateway, wherein the flow limiting threshold set for the service gateways is equal to flow limiting thresholds set for other service gateways in the service gateway group. It should be noted that the meaning of "acquire" herein includes, but is not limited to, receiving from a third-party device (e.g., a centralized control device, another service gateway, etc.); and being locally configured (for example, manually configured by an administrator, etc.).

Fourth Embodiment

Figure 14:
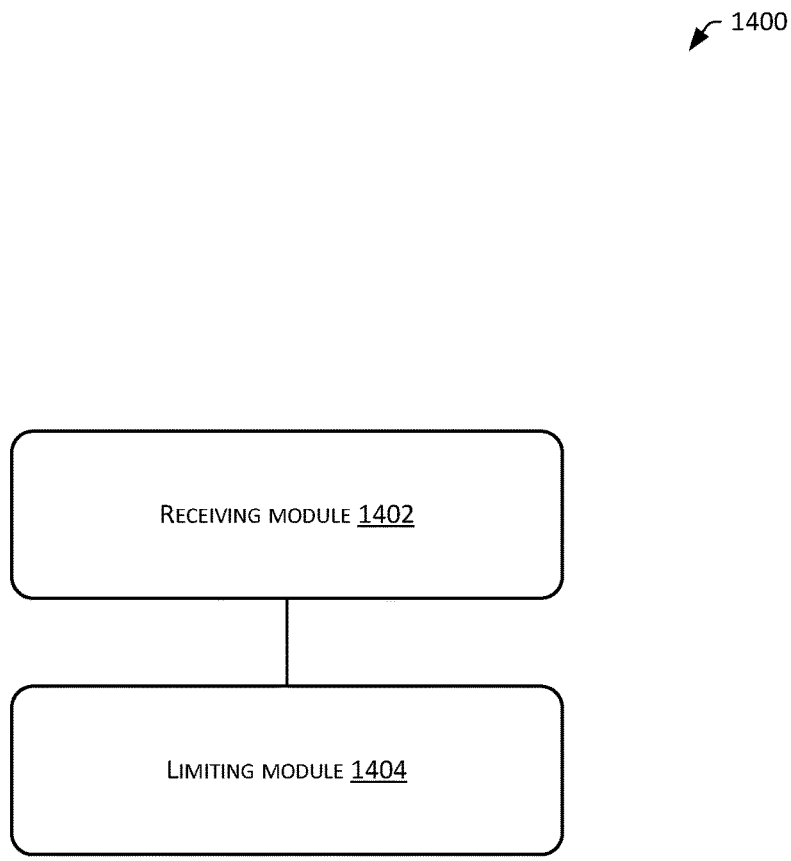
FIG. 14 is a schematic structural diagram of another optional apparatus for controlling a service transmission rate according to an embodiment of the present disclosure.

The present embodiment provides an apparatus for controlling a service transmission rate, configured to implement the method for controlling a service transmission rate in the third embodiment. The apparatus may be applied to a service gateway in a service gateway group, wherein service gateways in the service gateway group are gateways that distribute and transmit service data to an identical destination address in parallel, and the service transmission rate information is used for indicating a service transmission rate on the service gateway for the destination address. As shown in FIG. 14, the apparatus 1400 includes a receiving module 1402 and a limiting module 1404.

The receiving module 1402 is configured to receive specified thresholds, wherein the specified thresholds are determined using the following approach:

adjusting flow limiting thresholds allocated to service gateways to specified values to obtain specified thresholds when a service transmission rate on any one service gateway in a service gateway group is greater than a flow limiting threshold corresponding to that service gateway, wherein the specified values satisfy the following condition: a sum of the specified values on the service gateways is not greater than a bandwidth allocated to a destination address by an operator.

The limiting module 1404, which is connected to the receiving module 1402, is configured to limit a local transmission rate of service data based on the specified thresholds.

Optionally, a specified threshold can be determined using the following approach:

$$Th=(x/S)*B,$$

wherein Th represents a specified threshold, x represents a service transmission rate on each service gateway in a service gateway group; and S represents a total service transmission rate, where the total service transmission rate is obtained by performing an AND operation on transmission rates on all service gateways in the service gateway group for a destination address.

It should be noted that optional embodiments of the present embodiment can be referenced to the embodiments in the methods for controlling a service transmission rate in the first and third embodiments, and details thereof are not repeatedly described herein.

In addition, the modules involved in the present embodiment may be implemented by software or hardware. The latter may be manifested in the following forms: the receiving module 1402 and the limiting module 1404 being located in a same processor; or the receiving module 1402 and the limiting module 1404 being located in a first processor and a second processor respectively.

Fifth Embodiment

Figure 15:
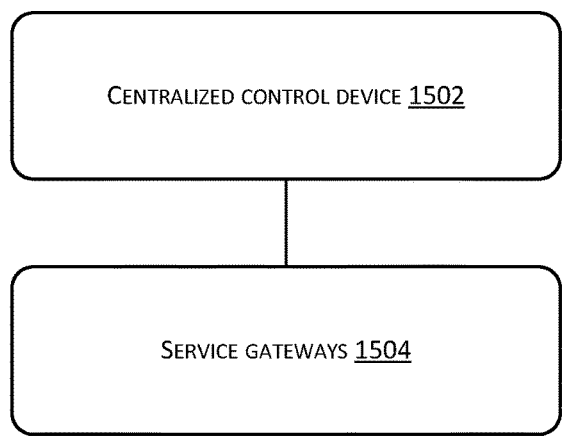
FIG. 15 is a schematic structural diagram of an optional system for controlling a service transmission rate according to an embodiment of the present disclosure.

The present embodiment is a centralized control solution, i.e., data collection and aggregation, threshold calculation and sending, etc., are all realized in a centralized control device. The present embodiment provides a control system for a service transmission rate. As shown in FIG. 15, the control system 1500 includes a centralized control device 1502 and a service gateway group 1504.

The centralized control device 1502 is configured to receive service transmission rate information reported by service gateways in a service gateway group, adjust flow limiting thresholds to the service gateways to specified values to obtain specified thresholds when a service transmission rate greater than a flow limiting threshold exists in service transmission rates on the service gateways, and send the specified thresholds to the service gateways, wherein the service gateways are gateways that transmit service data to an identical destination address in parallel and limit the service transmission rates of the service data based on respective flow limiting thresholds, the service transmission rate information being used for indicating a service transmission rate on each service gateway for the destination address, and the specified values satisfying the following condition: a sum of the specified values on the service gateways is not greater than a bandwidth allocated to the destination address by an operator.

The service gateways in the service gateway group 1504 are configured to report the service transmission rate information and limit the service transmission rate on each service gateway for the destination IP address based on the received specified thresholds.

It should be noted that other implemented functions of the centralized control device and the service gateway group in the present embodiment can be referenced to related descriptions of the first to fourth embodiments, and are not repeatedly described herein.

Sixth Embodiment

A solution provided in the present embodiment is a distributed control solution, i.e., data collection, real-time calculation and threshold sending of different destination addresses, etc., are distributed on different service gateways using a preset rule (e.g., a hash operation rule) for implementations. At the same time, thresholds for an identical destination IP are ensured to be calculated on a single service gateway, and information of service transmission rates of other service gateways for the destination IP is universally reported to that service gateway. This embodiment of the present disclosure provides a system for controlling a service transmission rate. The system includes a service gateway group.

A specified service gateway in the service gateway group is configured to receive service transmission rate information reported by other service gateways in the service gateway group that are different from the specified service gateway, and adjust flow limiting thresholds allocated to the service gateways in the service gateway group to specified values to obtain the specified thresholds when a service transmission rate on any one service gateway in the service gateway group is greater than a flow limiting threshold corresponding to that service gateway, and send the specified thresholds to the other service gateways.

The service gateways are gateways that transmit service data in parallel to an identical destination address and limit a service transmission rate of the service data based on the respective flow limiting thresholds. The service transmission rate information is used for indicating the service transmission rates on the service gateways for the destination address, and the specified values satisfy the following condition: a sum of the specified values on the service gateways is not greater than a bandwidth allocated to the destination address by an operator.

Optionally, the specified service gateway can be a service gateway determined using the following approach: performing a hash operation on data of the destination address, and selecting the specified service gateway from the service gateway group based on an operation result.

It should be noted that, reference may be made to the related description of the first to fourth embodiments for other implemented functions of the centralized control device and the service gateway group in the present embodiment, and details thereof are not repeatedly described herein.

Seventh Embodiment

The embodiments of the present disclosure can provide a computer terminal. The computer terminal may be any computer terminal device in a computer terminal group. Optionally, in the present embodiment, the computer terminal may also be replaced by a terminal device such as a mobile terminal.

Optionally, in the present embodiment, the computer terminal may be located in at least one of multiple network devices in a computer network.

In the present embodiment, the computer terminal may execute program codes of the following operations in a method for controlling a service transmission rate: acquiring service transmission rate information reported by service gateways in a service gateway group in a distributed environment, wherein the service gateways are gateways that simultaneously transmit service data to an identical destination address and limit service transmission rates of the service data based on respective flow limiting thresholds, and the service transmission rate information is used for indicating a service transmission rate on each service gateway for the destination address; determining whether the service transmission rate of each service gateway in the service gateway group indicated by the service transmission rate information is greater than a flow limiting threshold corresponding to the respective service gateway; adjusting the flow limiting thresholds allocated to the service gateways to specified values to obtain specified thresholds when at least one determination result is affirmative, where the specified values satisfy the following condition: a sum of the specified values on the service gateways is not greater than a bandwidth allocated to the destination address by an operator; and sending the specified thresholds to the service gateways.

Figure 16:
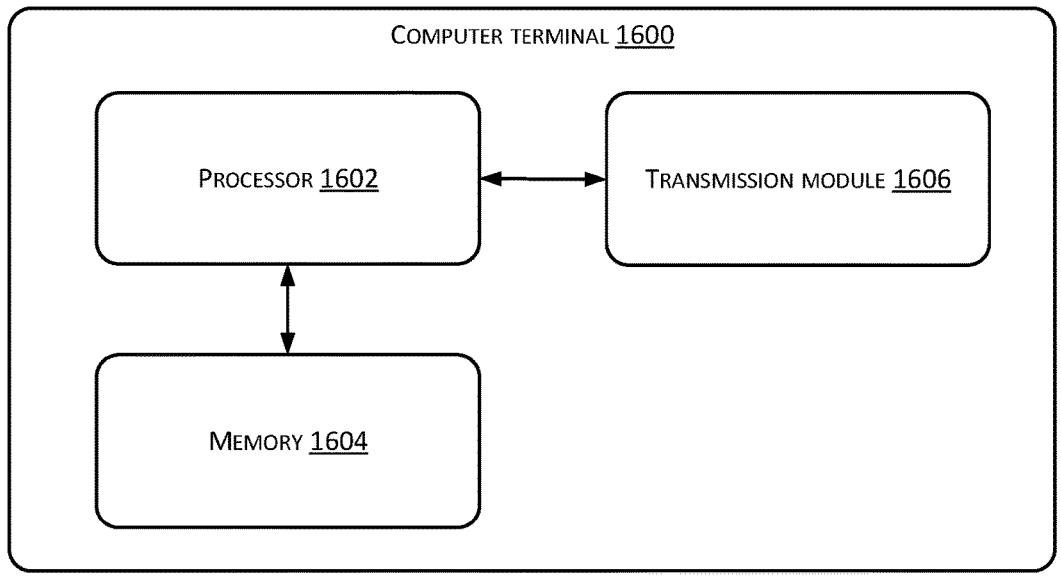
FIG. 16 is a structural block diagram of a computer terminal according to an embodiment of the present disclosure.

Optionally, FIG. 16 is a structural block diagram of a computer terminal 1600 according to the embodiments of the present disclosure. As shown in FIG. 16, the computer terminal 1600 may include: one or more (only one is shown) processors 1602, a memory 1604, and a transmission device 1606.

The memory 1604 may be configured to store software programs and modules, for example, program instructions/modules corresponding to the methods and apparatuses for detecting security vulnerabilities in the embodiments of the present disclosure. The processor 1602 can run the software programs and modules stored in the memory 1604, to implement various functional applications and data processing, i.e., implementing the methods for detecting security vulnerabilities. The memory 1604 may include a high-speed random access memory, and may also include a nonvolatile memory, for example, one or more magnetic storage devices, flash memories or other nonvolatile solid-state memories. In some examples, the memory 1604 may further include memories remotely disposed relative to the processor 1602, and these remote memories may be connected to the terminal A via a network. Examples of the network include, but are not limited to, the Internet, an intranet, a local area network, a mobile communications network, or a combination thereof.

The transmission device 1606 is configured to receive or send data via a network. The network may specifically include a wired network and a wireless network. In an example, the transmission device 1606 may include a network interface controller (NIC), which can be connected to other network devices and routers via a network cable so as to communicate with the Internet or a local area network. In an example, the transmission device 1606 may be a radio frequency (RF) module, which is configured to communicate with the Internet wirelessly.

Specifically, the memory 1604 is configured to store information of preset action conditions and preset privileged users, and applications.

The processor 1602 can invoke the information and the applications stored in the memory 1604 by using the transmission device to perform the following operations: acquiring a proportion of the service transmission rate on each service gateway in a total service transmission rate, wherein the total service transmission rate is obtained by performing an AND operation on the service transmission rates on all the service gateways in the service gateway group for the destination address; and determining according to the proportion and the bandwidth the specified thresholds reallocated to the service gateways in the service gateway group.

Optionally, the processor 1602 can also perform program codes of the following operation: selecting a service gateway from the service gateway group as the specified service gateway according to a hash algorithm.

The embodiments of the present disclosure solve the technical problem that there is no technical solution effectively ensuring that a total traffic of flows limited in parallel satisfies an expected threshold after the flows pass through multiple service gateways in a distributed environment.

One of ordinary skill in the art may understand that the structure shown in FIG. 16 is illustrative only, and the computer terminal may also be a terminal device such as a smart phone (e.g., an Android phone, an iOS phone, or the like), a tablet computer, a palmtop computer, a Mobile Internet Device (MID), or a PAD. FIG. 16 does not have any limitation on the structure of the electronic device. For example, the computer terminal A may also include more or fewer components (e.g., a network interface, a display device and so on) than the ones shown in FIG. 16, or have a configuration different from that shown in FIG. 16.

One of ordinary skill in the art may understand that all or some of operations in the methods of the above embodiments may be completed through a program to instruct relevant hardware of the terminal device. The program may be stored in a computer readable storage media. The storage media can include: a flash disk, a Read-Only Memory (ROM), a Random Access Memory (RAM), a magnetic disk, an optical disc, etc.

Eighth Embodiment

The embodiments of the present disclosure further provide a storage media. Optionally, in the present embodiment, the storage medium may be configured to store program codes for implementing the method for controlling a service transmission rate provided in the first embodiment.

Optionally, in the present embodiment, the storage media may be located in any computer terminal in a computer terminal group in a computer network, or located in any mobile terminal in a mobile terminal group.

Optionally, in the present embodiment, the storage media is configured to store program codes for performing the following operations: acquiring service transmission rate information reported by service gateways in a service gateway group in a distributed environment, wherein the service gateways are gateways that transmit service data to an identical destination address in parallel and limit service transmission rates of the service data based on respective flow limiting thresholds, and the service transmission rate information is used for indicating a service transmission rate on each service gateway for the destination address; determining whether a service transmission rate of each service gateway in the service gateway group indicated by the service transmission rate information is greater than the flow limiting threshold corresponding to the service gateway; adjusting the flow limiting thresholds allocated to the service gateways to specified values to obtain specified thresholds when at least one determination result is affirmative, wherein the specified values satisfy the following condition: a sum of the specified values on the service gateways is not greater than a bandwidth allocated to the destination address by an operator; and sending the specified thresholds to the service gateways.

It should be noted herein that any computer terminal in the computer terminal group may establish a communication relationship with a website server and a scanner. The scanner may scan value commands of a web application executed by php on the computer terminal.

Ninth Embodiment

The embodiments of the present disclosure can provide a computer terminal. The computer terminal may be a terminal having a structure to be the same as the structure of the computer terminal described in the seventh embodiment and having functions being different from the functions implemented by the computer terminal described in the seventh embodiment. Reference may be made to FIG. 16 for details about the structure, and the details thereof are not repeatedly described herein.

In the present embodiment, the computer terminal may execute program codes of the following operations in the method for controlling a service transmission rate: receiving specified thresholds by service gateways in a service gateway group, wherein the service gateways are gateways that transmit service data to an identical destination address in parallel and limit service transmission rates of the service data based on respective flow limiting thresholds, and the specified thresholds are determined using the following manner: adjusting the flow limiting thresholds allocated to the service gateways to specified values to obtain the specified thresholds when a service transmission rate on any one service gateway in the service gateway group is greater than a flow limiting threshold corresponding to the service gateway, wherein the specified values satisfy the following condition: a sum of the specified values on the service gateways is not greater than a bandwidth allocated to the destination address by an operator; and limiting, by the service gateways, respective local transmission rates of the service data based on the specified thresholds.

The memory 1604 in the computer terminal shown in FIG. 16 can be configured to store software programs and modules, for example, program instructions/modules corresponding to the methods and apparatuses for controlling a service transmission rate in the embodiments of the present disclosure.

The processor 1602 may invoke information and an application stored in the memory 1604 through the transmission device to perform the following operation: reporting, by the service gateways, the respective local service transmission rates for the destination address to a centralized control device in the distributed environment or a specified service gateway in the service gateway group.

Optionally, the processor 1602 may also execute program codes of the following operation: acquiring, by a service gateway, a flow limiting threshold and configuring the flow limiting threshold for the service gateway, wherein the flow limiting threshold configured for the service gateway is equal to flow limiting thresholds configured for other service gateways in the service gateway group.

The embodiments of the present disclosure solve the technical problem that there is no technical solution effectively ensuring that a total traffic of flows limited in parallel satisfies an expected threshold after the flows pass through multiple service gateways in a distributed environment.

Tenth Embodiment

The embodiments of the present disclosure further provide a storage media. Optionally, in the present embodiment, the storage media may be configured to store program code for implementing the method for controlling a service transmission rate provided in the first embodiment.

Optionally, in the present embodiment, the storage media may be located in any computer terminal in a computer terminal group in a computer network, or located in any mobile terminal in a mobile terminal group.

Optionally, in the present embodiment, the storage media is configured to store program codes for performing the following operations: receiving specified thresholds by service gateways in a service gateway group, wherein the service gateways are gateways that transmit service data to an identical destination address in parallel and limit service transmission rates of the service data based on respective flow limiting thresholds, and the specified thresholds are determined using the following approach: adjusting the flow limiting thresholds allocated to the service gateways to specified values to obtain the specified thresholds when a service transmission rate on any one service gateway in the service gateway group is greater than a flow limiting threshold corresponding to the service gateway, wherein the specified values satisfy the following condition: a sum of the specified values on the service gateways is not greater than a bandwidth allocated to the destination address by an operator; and limiting, by the service gateways, respective local transmission rates of the service data based on the specified thresholds.

It should be noted herein that any computer terminal in the computer terminal group may establish a communication relationship with a website server and a scanner. The scanner may scan value commands of a web application executed by php on the computer terminal.

The sequence numbers of the foregoing embodiments of the present disclosure are merely used for the purpose of description, and do not imply the qualities of the embodiments.

In the foregoing embodiments of the present disclosure, the description of each embodiment has its own focus. Content that is not detailed in a certain embodiment can be referenced to the relevant description of another embodiment.

In the embodiments provided in the present application, it should be understood that the disclosed service gateway may be implemented in other manners. The apparatus embodiments described above are only exemplary. For example, a division of units is merely division based on logical functions and other division approaches can exist in practical implementations. For example, a plurality of units or components may be combined or integrated into another system, or some features may be ignored or not performed. In addition, mutual coupling or direct coupling or communication connections displayed or discussed may be indirect coupling or communication connections implemented by using some interfaces, units or modules, and may be implemented in an electrical or other form.

The units described as separate components may be or may not be physically separate. Components displayed as units may be or may not be physical units, and may be located at a single location or distributed among a plurality of network units. Some or all of the units may be selected according to actual needs to achieve the objectives of the solutions of the embodiments.

In addition, functional units in the embodiments of the present disclosure may be integrated into a single processing unit. Alternatively, each of the units may exist as an independent physical entity. Alternatively, two or more units may be integrated into a single unit. The integrated unit may be implemented in a form of hardware, or may be implemented in a form of a software functional unit.

When the integrated unit is implemented in a form of a software functional unit, and sold or used as an independent product, the integrated unit may be stored in a computer readable storage media. Based on such understanding, the essence of the technical solutions of the present disclosure, or the parts that make contributions to the existing technologies, or all or some of the technical solutions may be implemented in a form of a software product. The computer software product is stored in a storage media, and includes multiple instructions to cause a computing device (which may be a personal computer, a server, a network device or the like) to perform all or some of the operations of the methods described in the embodiments of the present disclosure. The foregoing storage media includes various media that can store program codes, such as a USB flash drive, a ROM, a RAM, a removable hard disk, a magnetic disk, or an optical disc.

The above are only exemplary embodiments of the present disclosure. It should be noted by one of ordinary skill in the art that multiple improvements and modifications may be made without departing from the principles of the present disclosure, and such improvements and modifications should also be construed as falling within the scope of protection of the present disclosure.

The present disclosure may be further understood with clauses as follows.

Clause 1: A method for controlling a service transmission rate, comprising: acquiring service transmission rate information reported by service gateways in a service gateway group in a distributed environment, wherein the service gateways are gateways that transmit service data to an identical destination address in parallel and limit service transmission rates of the service data based on respective flow limiting thresholds, and the service transmission rate information is used for indicating a service transmission rate on each service gateway for the destination address; determining whether the service transmission rates of the service gateways in the service gateway group indicated by the service transmission rate information are greater than the respective flow limiting thresholds corresponding to the service gateways; adjusting the flow limiting thresholds allocated to the service gateways to specified values to obtain specified thresholds when at least one determination result is affirmative, wherein the specified values satisfy the following condition: a sum of the specified values on the service gateways is not greater than a bandwidth allocated to the destination address by an operator; and sending the specified thresholds to the service gateways.

Clause 2: The method of Clause 1, wherein the specified thresholds are determined using the following approach: calculating respective ratios between the service transmission rates on the service gateways and a total service transmission rate, wherein the total service transmission rate is obtained by performing an AND operation on the service transmission rates on all the service gateways in the service gateway group for the destination address; and determining the specified thresholds reallocated to the service gateways in the service gateway group based on the respective ratios and the bandwidth.

Clause 3: The method of Clause 1, wherein before acquiring the service transmission rate information reported by the service gateway group in the distributed environment, the method further comprises allocating the flow limiting thresholds to the service gateways in the service gateway group, wherein the flow limiting thresholds allocated to the service gateways are identical.

Clause 4: The method of Clause 1, wherein the method is applied to a centralized control device in the distributed environment or a specified service gateway in the service gateway group, and wherein the centralized control device is a device in the distributed environment that is different from the service gateways in the service gateway group.

Clause 5: The method of any one of Clause 1-4, wherein the specified service gateway is determined using the following approach: performing a hash operation on the destination address to obtain a hash value corresponding to the destination address; and selecting a service gateway corresponding to the hash value as the specified service gateway from the service gateway group.

Clause 6: A method for controlling a service transmission rate, comprising: receiving specified thresholds by service gateways in a service gateway group, wherein the service gateways are gateways that transmit service data to an identical destination address in parallel and limit a service transmission rate of the service data based on respective flow limiting thresholds, and the specified thresholds are determined using the following approach: adjusting the flow limiting thresholds allocated to the service gateways to specified values to obtain the specified thresholds when a service transmission rate on any one service gateway in the service gateway group is greater than a flow limiting threshold corresponding to the service gateway, wherein the specified values satisfy the following condition: a sum of the specified values on the service gateways is not greater than a bandwidth allocated to the destination address by an operator; and limiting, by the service gateways, respective local transmission rates of the service data based on the specified thresholds.

Clause 7: The method of Clause 6, wherein the specified thresholds are determined using the following approach:

$$Th=(x/S)*B,$$

wherein Th denotes a specified threshold, x denotes a service transmission rate on each service gateway in the service gateway group, S denotes a total service transmission rate, B denotes a constant equal to the bandwidth allocated to the destination address by the operator, and the total service transmission rate is obtained by performing an AND operation on transmission rates on all the service gateways in the service gateway group for the destination address.

Clause 8: The method of Clause 6, wherein before receiving the specified thresholds by the service gateways in the service gateway group, the method further comprises: reporting, by the service gateways, the local service transmission rates for the destination address to a centralized control device in the distributed environment or a specified service gateway in the service gateway group.

Clause 9: The method of any one of Clause 6-8, wherein before receiving the specified thresholds by the service gateways in the service gateway group, the method further comprises:

acquiring, by the service gateways, the flow limiting thresholds and configuring the flow limiting thresholds for the service gateways, wherein a flow limiting threshold configured for a service gateway is equal to flow limiting thresholds configured for other service gateways in the service gateway group.

Clause 10: An apparatus for controlling a service transmission rate, comprising: an acquisition module configured to acquire service transmission rate information reported by service gateways in a service gateway group in a distributed environment, wherein the service gateways are gateways that transmit service data to an identical destination address in parallel and limit a service transmission rate of the service data based on respective flow limiting thresholds; and the service transmission rate information is used to indicate a service transmission rate on each service gateway for the destination address; a determination module configured to determine whether the service transmission rate of each service gateway in the service gateway group indicated by the service transmission rate information is greater than a flow limiting threshold corresponding to the respective service gateway; an adjustment module configured to adjust the flow limiting thresholds allocated to the service gateways to specified values to obtain specified thresholds when at least one determination result output by the determination module is affirmative, wherein the specified values satisfy the following condition: a sum of the specified values on the service gateways is not greater than a bandwidth allocated to the destination address by an operator; and a sending module configured to send the specified thresholds to the service gateways.

Clause 11: The apparatus of Clause 10, wherein the determination module comprises: an acquisition unit configured to calculate a proportion of the service transmission rate on each service gateway in a total service transmission rate, wherein the total service transmission rate is obtained by performing an AND operation on the service transmission rates on all the service gateways in the service gateway group for the destination address; and a determination unit configured to determine the specified thresholds reallocated to the service gateways in the service gateway group according to the proportion and the bandwidth.

Clause 12: An apparatus for controlling a service transmission rate, which is applied to service gateways in a service gateway group, wherein the service gateways in the service gateway group are gateways that transmit service data to an identical destination address in parallel and limit a service transmission rate of the service data based on respective flow limiting thresholds, wherein the apparatus comprises: a receiving module configured to receive specified thresholds, wherein the specified thresholds are determined using the following approach: adjusting the flow limiting thresholds allocated to the service gateways to specified values to obtain the specified thresholds when a service transmission rate on any one service gateway in the service gateway group is greater than a flow limiting threshold corresponding to the service gateway, wherein the specified values satisfy the following condition: a sum of the specified values on the service gateways is not greater than a bandwidth allocated to the destination address by an operator; and a limiting module configured to limit a local transmission rate of the service data based on the specified thresholds.

Clause 13: The apparatus of Clause 12, wherein the specified thresholds are determined using the following approach:

$$Th=(x/S)*B,$$

wherein Th denotes a specified threshold, x denotes a service transmission rate on each service gateway in the service gateway group, S denotes a total service transmission rate, B denotes a constant equal to the bandwidth allocated to the destination address by the operator, and the total service transmission rate is obtained by performing an AND operation on the transmission rates on all the service gateways in the service gateway group for the destination address.

Clause 14: A system for controlling a service transmission rate, comprising: a centralized control device and a service gateway group, wherein: the centralized control device is configured to receive service transmission rate information reported by service gateways in the service gateway group, and adjust flow limiting thresholds allocated to the service gateways to specified values to obtain specified thresholds when a service transmission rate the service transmission rates on the service gateways greater than a respective flow limiting threshold, and send the specified thresholds to the service gateways, wherein the service gateways are gateways that transmit service data to an identical destination address in parallel and limit a service transmission rate of the service data based on the respective flow limiting thresholds, the service transmission rate information is used to indicate a service transmission rate on each service gateway for the destination address, and the specified values satisfy the following condition: a sum of the specified values on the service gateways is not greater than a bandwidth allocated to the destination address by an operator; and the service gateways in the service gateway group is configured to report the service transmission rate information and limit the service transmission rate on each service gateway for the destination address based on the received specified thresholds.

Clause 15: A system for controlling a service transmission rate, comprising: a service gateway group, wherein: a specified service gateway in the service gateway group is configured to receive service transmission rate information reported by other service gateways in the service gateway group that are different from the specified service gateway, and adjust flow limiting thresholds allocated to the service gateways in the service gateway group to specified values to obtain the specified thresholds when a service transmission rate on any one service gateway in the service gateway group is greater than a flow limiting threshold corresponding to the service gateway, and send the specified thresholds to the other service gateways; wherein the service gateways are gateways that transmit service data to an identical destination address in parallel and limit a service transmission rate of the service data based on the respective flow limiting thresholds, the service transmission rate information is used to indicate service transmission rates on the service gateways for the destination address, and the specified values satisfy the following condition: a sum of the specified values on the service gateways is not greater than a bandwidth allocated to the destination address by an operator.

Clause 16: The system of Clause 15, wherein the specified service gateway is a service gateway determined using the following approach: performing a hash operation on data of the destination address, and selecting the specified service gateway from the service gateway group based on an operation result.

What is claimed is:

1. A method comprising:
   acquiring service transmission rate information reported by service gateways in a service gateway group in a distributed environment, the service transmission rate information being used for indicating service transmission rates on the service gateways for a same destination address;
   determining whether the service transmission rates of the service gateways in the service gateway group indicated by the service transmission rate information are greater than respective flow limiting thresholds corresponding to the service gateways;
   adjusting the respective flow limiting thresholds allocated to the service gateways to specified values to obtain specified thresholds when at least one determination result is affirmative; and
   sending the specified thresholds to the service gateways.

2. The method of claim 1, wherein the specified thresholds are determined using the following approach:
   calculating respective ratios between the service transmission rates on the service gateways and a total service transmission rate; and
   determining the specified thresholds reallocated to the service gateways in the service gateway group based on the respective ratios and the bandwidth.

3. The method of claim 2, wherein the total service transmission rate is obtained by performing an AND operation on the service transmission rates on the service gateways in the service gateway group for the destination address.

4. The method of claim 1, further comprising allocating the flow limiting thresholds to the service gateways in the service gateway group before acquiring the service transmission rate information reported by the service gateway group in the distributed environment.

5. The method of claim 4, wherein the flow limiting thresholds allocated to the service gateways are identical.

6. The method of claim 1, wherein the method is applied to a centralized control device in the distributed environment or a specified service gateway in the service gateway group, and wherein the centralized control device is a device in the distributed environment that is different from the service gateways in the service gateway group.

7. The method of claim 1, wherein the specified service gateway is determined by:
   performing a hash operation on the destination address to obtain a hash value corresponding to the destination address; and
   selecting a service gateway corresponding to the hash value as the specified service gateway from the service gateway group.

8. The method of claim 1, wherein a sum of the specified values on the service gateways is not greater than a bandwidth allocated to the destination address.

9. The method of claim 1, wherein the service gateways are gateways that transmit service data to the same destination address in parallel and limit a service transmission rate of the service data based on the respective flow limiting thresholds corresponding to the service gateways.

10. An apparatus comprising:
    one or more processors;
    memory;
    a receiving module stored in the memory and executable by the one or more processors to receive specified thresholds, wherein the specified thresholds are determined by:
    adjusting the flow limiting thresholds allocated to service gateways in a service gateway group to specified values to obtain the specified thresholds when a service transmission rate on at least one service gateway in the service gateway group is greater than a flow limiting threshold corresponding to the at least one service gateway, wherein a sum of the specified values on the service gateways is not greater than a bandwidth allocated to the destination address; and
    a limiting module configured to limit a local transmission rate of service data to a same destination address based on the specified thresholds.

11. The apparatus of claim 10, wherein the service gateways in the service gateway group are gateways that transmit the service data to the same destination address in parallel.

12. The apparatus of claim 10, wherein a specified threshold of the specified thresholds is determined based on a ratio between a service transmission rate on a corresponding service gateway in the service gateway group and a total service transmission rate, and the total service transmission rate is obtained by performing an AND operation on transmission rates on all the service gateways in the service gateway group for the same destination address.

13. One or more computer-readable media storing executable instructions that, when executed by one or more processors, cause the one or more processors to perform acts comprising:
    acquiring service transmission rate information reported by service gateways in a service gateway group in a distributed environment, the service transmission rate information being used for indicating service transmission rates on the service gateways for a same destination address;
    determining whether the service transmission rates of the service gateways in the service gateway group indicated by the service transmission rate information are greater than respective flow limiting thresholds corresponding to the service gateways;
    adjusting the respective flow limiting thresholds allocated to the service gateways to specified values to obtain specified thresholds when at least one determination result is affirmative; and
    sending the specified thresholds to the service gateways.

14. The one or more computer-readable media of claim 13, wherein the specified thresholds are determined using the following approach:
    calculating respective ratios between the service transmission rates on the service gateways and a total service transmission rate; and
    determining the specified thresholds reallocated to the service gateways in the service gateway group based on the respective ratios and the bandwidth.

15. The one or more computer-readable media of claim 14, wherein the total service transmission rate is obtained by performing an AND operation on the service transmission rates on the service gateways in the service gateway group for the destination address.

16. The one or more computer-readable media of claim 13, the acts further comprising allocating the flow limiting thresholds to the service gateways in the service gateway group before acquiring the service transmission rate information reported by the service gateway group in the distributed environment, and wherein the flow limiting thresholds allocated to the service gateways are identical.

17. The one or more computer-readable media of claim 13, wherein the method is applied to a centralized control device in the distributed environment or a specified service gateway in the service gateway group, and wherein the centralized control device is a device in the distributed environment that is different from the service gateways in the service gateway group.

18. The one or more computer-readable media of claim 13, wherein the specified service gateway is determined by:

performing a hash operation on the destination address to obtain a hash value corresponding to the destination address; and selecting a service gateway corresponding to the hash value as the specified service gateway from the service gateway group.

19. The one or more computer-readable media of claim 13, wherein a sum of the specified values on the service gateways is not greater than a bandwidth allocated to the destination address.

20. The one or more computer-readable media of claim 13, wherein the service gateways are gateways that transmit service data to the same destination address in parallel and limit a service transmission rate of the service data based on the respective flow limiting thresholds corresponding to the service gateways.

* * * * *